United States Patent [19]
Marfurt et al.

[11] Patent Number: 5,930,730
[45] Date of Patent: Jul. 27, 1999

[54] METHOD AND APPARATUS FOR SEISMIC SIGNAL PROCESSING AND EXPLORATION

[75] Inventors: Kurt J. Marfurt, Tulsa, Okla.; R. Lynn Kirlin, Victoria, Canada; Steven L. Farmer, Tulsa, Okla.; Michael S. Bahorich, Arvada, Colo.

[73] Assignee: Amoco Corporation, Chicago, Ill.

[21] Appl. No.: 08/707,674

[22] Filed: Sep. 13, 1996

Related U.S. Application Data

[63] Continuation-in-part of application No. 08/353,934, Dec. 12, 1994, Pat. No. 5,563,949
[60] Provisional application No. 60/005,032, Oct. 6, 1995.

[51] Int. Cl.⁶ .................................................. G06F 19/00
[52] U.S. Cl. .............................................................. 702/16
[58] Field of Search .................................... 364/421, 422; 367/9, 42, 47, 29, 68, 72; 702/10, 13, 16

[56] References Cited

U.S. PATENT DOCUMENTS

| H374 | 11/1987 | Abo-Zena et al. ....................... 342/378 |
| 3,599,175 | 8/1971 | Hollingsworth et al. ....... 340/15.5 AC |
| 3,614,623 | 10/1971 | McAuliffe ................................. 325/42 |
| 3,622,967 | 11/1971 | Foster et al. .................... 340/15.5 MC |

(List continued on next page.)

FOREIGN PATENT DOCUMENTS

| 0181216 | 7/1985 | European Pat. Off. . |
| 0172065 | 8/1963 | Russian Federation ................. 367/40 |
| 2066467 | 7/1981 | United Kingdom . |

OTHER PUBLICATIONS

Bahorich, Michael S., Amoco Production Research and Bridges, S. Rutt, Advance Geophysical Case Histories 1: Seismic Stratigraphy/Seismic Sequence Attribute Map (SSAM) CH1.1, Oct. 26, 1992; SEG New Orleans The Society of Exploration Geophysicists Sixty–Second Annual International Meeting & Exposition, Oct. 25–29, 1992.

Yanovskiy, A.K., and Bogolyubskiy A.D., "Sposob avtomaticheskoy approksimatsii vertikal'nogo godografa, osnovannyy na posledova–Tel'nom vydelenii plastov" in *Prikladnaya geofizika*, No. 82, 1976; pp. 95–100. (Translation from Russian).

Bahorich, Mike and Farmer, Steve; 3–D seismic discontinuity for faults and stratigraphic features: The Coherence Cube, *The Leading Edge*, The Society of Exploration Geophysicists ISN 1070–485X Oct. 1995, pp. 1053–1058.

Neidell, N.S. and Taner, M. Turhan; "Semblance and Other Coherency Measures for Multichannel Data", *Geophysics*, vol. 36, No. 3 (Jun. 1971), pp. 482–497, 6 FIGS.

(List continued on next page.)

*Primary Examiner*—Donald E. McElheny, Jr.
*Attorney, Agent, or Firm*—James A. Gabala; Thomas A. Yassen; Robert E. Sloat

[57] ABSTRACT

A method, a map and an article of manufacture for the exploration of hydrocarbons. In one embodiment of the invention, the method comprises the steps of: accessing 3D seismic data; dividing the data into an array of relatively small three-dimensional cells; determining in each cell the semblance/similarity, the dip and dip azimuth of the seismic traces contained therein; and displaying dip, dip azimuth and the semblance/similarity of each cell in the form a two-dimensional map. In one embodiment, semblance/similarity is a function of time, the number of seismic traces within the cell, and the apparent dip and apparent dip azimuth of the traces within the cell; the semblance/similarity of a cell is determined by making a plurality of measurements of the semblance/similarity of the traces within the cell and selecting the largest of the measurements. In addition, the apparent dip and apparent dip azimuth, corresponding to the largest measurement of semblance/similarity in the cell, are deemed to be estimates of the true dip and true dip azimuth of the traces therein. A color map, characterized by hue, saturation and lightness, is used to depict semblance/similarity, true dip azimuth and true dip of each cell; true dip azimuth is mapped onto the hue scale, true dip is mapped onto the saturation scale, and the largest measurement of semblance/similarity is mapped onto the lightness scale of the color map.

45 Claims, 27 Drawing Sheets

U.S. PATENT DOCUMENTS

| | | | |
|---|---|---|---|
| 3,638,178 | 1/1972 | Stephenson | 340/15.5 |
| 3,714,621 | 1/1973 | Waters | 340/15.5 |
| 3,787,855 | 1/1974 | Cragon et al. | 343/17.1 R |
| 3,931,609 | 1/1976 | Anstey | 340/15.5 |
| 3,961,306 | 6/1976 | Anstey | 340/15.5 |
| 4,223,399 | 9/1980 | Hackett | 367/41 |
| 4,279,026 | 7/1981 | Lambright et al. | 340/15.5 |
| 4,298,968 | 11/1981 | Ruehle et al. | 367/59 |
| 4,393,488 | 7/1983 | Gassaway et al. | 367/75 |
| 4,403,312 | 9/1983 | Thomason | 181/108 |
| 4,467,461 | 8/1984 | Rice | 367/71 |
| 4,503,527 | 3/1985 | Pann | 367/38 |
| 4,633,400 | 12/1986 | Chittineni | 364/421 |
| 4,661,935 | 4/1987 | Shock et al. | 367/47 |
| 4,683,556 | 7/1987 | Willis | 367/27 |
| 4,695,984 | 9/1987 | Paal | 367/54 |
| 4,713,775 | 12/1987 | Scott et al. | 364/513 |
| 4,729,101 | 3/1988 | Hanson et al. | 364/421 |
| 4,736,347 | 4/1988 | Goldberg et al. | 367/46 |
| 4,745,550 | 5/1988 | Witkin et al. | 364/422 |
| 4,779,237 | 10/1988 | Bodine | 367/47 |
| 4,799,201 | 1/1989 | Nelson | 367/39 |
| 4,800,539 | 1/1989 | Corn et al. | 367/72 |
| 4,809,240 | 2/1989 | Mufti | 367/72 |
| 4,813,026 | 3/1989 | Quaglino | 367/29 |
| 4,829,487 | 5/1989 | Malloy | 367/40 |
| 4,839,869 | 6/1989 | Corcoran | 367/53 |
| 4,843,599 | 6/1989 | Bucker | 367/70 |
| 4,849,887 | 7/1989 | Skylas | 367/38 |
| 4,866,659 | 9/1989 | Lin et al. | 364/421 |
| 4,878,204 | 10/1989 | Black et al. | 367/53 |
| 4,881,207 | 11/1989 | Dubesset et al. | 367/31 |
| 4,884,248 | 11/1989 | Laster et al. | 367/73 |
| 4,894,807 | 1/1990 | Alam et al. | 367/15 |
| 4,916,615 | 4/1990 | Chittineni | 364/421 |
| 4,951,264 | 8/1990 | Yamamoto | 367/15 |
| 4,951,266 | 8/1990 | Hsu | 367/25 |
| 4,964,087 | 10/1990 | Widrow | 367/45 |
| 4,964,088 | 10/1990 | Chittineni | 367/51 |
| 4,970,699 | 11/1990 | Bucker et al. | 367/70 |
| 4,984,220 | 1/1991 | Bodine et al. | 367/68 |
| 5,008,861 | 4/1991 | Gallagher | 367/59 |
| 5,031,155 | 7/1991 | Hsu | 367/25 |
| 5,047,933 | 9/1991 | Harita et al. | 364/421 |
| 5,047,991 | 9/1991 | Hsu | 367/25 |
| 5,051,960 | 9/1991 | Levin | 367/24 |
| 5,056,066 | 10/1991 | Howard | 367/72 |
| 5,079,703 | 1/1992 | Mosher et al. | 364/421 |
| 5,105,356 | 4/1992 | Maute et al. | 364/422 |
| 5,130,951 | 7/1992 | Kingman | 367/82 |
| 5,132,938 | 7/1992 | Walters | 367/38 |
| 5,136,553 | 8/1992 | Kelly et al. | 367/52 |
| 5,153,858 | 10/1992 | Hildebrand | 364/421 |
| 5,181,171 | 1/1993 | McCormack et al. | 364/421 |
| 5,189,643 | 2/1993 | Wang et al. | 367/421 |
| 5,191,526 | 3/1993 | Laster et al. | 364/421 |
| 5,226,019 | 7/1993 | Bahorich | 367/74 |
| 5,245,587 | 9/1993 | Hutson | 367/100 |
| 5,265,192 | 11/1993 | McCormack | 395/22 |
| 5,295,086 | 3/1994 | Kumazawa et al. | 364/572 |
| 5,299,576 | 4/1994 | Shiba | 128/660.07 |
| 5,309,360 | 5/1994 | Monk et al. | 364/420 |
| 5,563,949 | 10/1996 | Bahorich et al. | 364/421 |

OTHER PUBLICATIONS

Vossler, Donald A., Landmark Graphics Corp., Automatic Whole Section Seismic Reflection Mapping; The Society of Exploration Geophysicists Sixty–Second Annual International Meeting & Exposition, 1988.

Vossler, Donald A., Landmark Graphics Corp., Automatic Declination of Lateral Facies Changes in Clatic Environments; SEG Dallas The Society of Exploration Geophysicists Fifty–Ninth Annual International Meeting & Exposition, Oct. 29–Nov. 2, 1989.

Taner, M.T., Koehler, F. and Sheriff, R.E., Complex Seismic Trace Analysis, *Geophysics*, vol. 44, No. 6 (Jun. 1979), pp. 1041–1063, 16 FIGS, 1 table.

AZIMUTH, φ ⟶ HUE, H

COHERENCY, c ⟶ LIGHTNESS, L

DIP, d ⟶ SATURATION, S

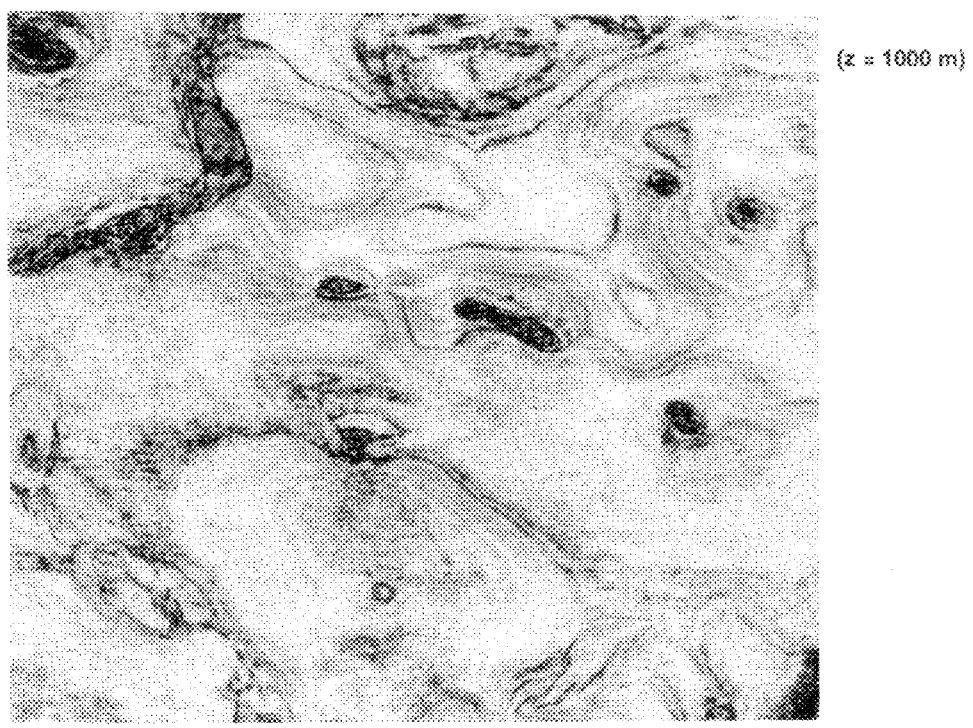
FIG. 15A (z = 1000 m)

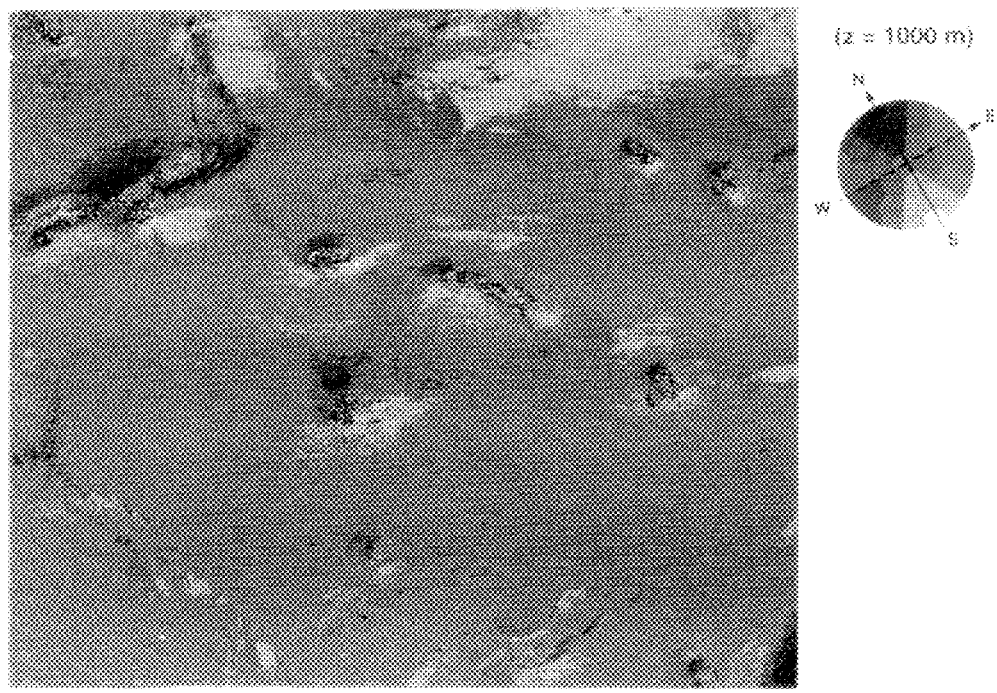

METHOD AND APPARATUS FOR SEISMIC SIGNAL PROCESSING AND EXPLORATION

CROSS-REFERENCE

This patent application is a continuation in part of a provisional patent application filed on Oct. 6, 1995, and having a Ser. No. 60/005,032 and a U.S. patent application to Bahorich and Farmer, having a Ser. No. 08/353,934 and a filing date of Dec. 12, 1994, now U.S. Pat. No. 5,563,949.

TECHNICAL FIELD

This invention relates to the general subject of seismic exploration and, in particular, to methods and devices for identifying structural and stratigraphic features in three dimensions.

BACKGROUND OF THE INVENTION

In seismic exploration, seismic data is acquired along lines (see lines 10 and 11 of FIG. 1) that consist of geophone arrays onshore or hydrophone streamer traverses offshore. Geophones and hydrophones act as sensors to receive energy that is transmitted into the ground and reflected back to the surface from subsurface rock interfaces. Energy is often provided onshore by Vibroseis® vehicles which transmit pulses by shaking the ground at pre-determined intervals and frequencies on the surface. Offshore, airgun sources are usually often used. Subtle changes in the energy returned to surface often reflect variations in the stratigraphic, structural and fluid contents of the reservoirs.

In performing three-dimensional (3D) seismic exploration, the principle is similar; however, lines and arrays are more closely spaced to provide more detailed subsurface coverage. With this high density coverage, extremely large volumes of digital data need to be recorded, stored and processed before final interpretation can be made. Processing requires extensive computer resources and complex software to enhance the signal received from the subsurface and to mute accompanying noise which masks the signal.

After the data is processed, geophysical personnel assemble and interpret the 3D seismic information in the form of a 3D data cube (See FIG. 2) which effectively represents a display of subsurface features. Using this data cube, information can be displayed in various forms. Horizontal time slice maps can be made at selected depths (See FIG. 3). Using a computer workstation, an interpreter can also slice through the field to investigate reservoir issues at different seismic horizons. Vertical slices or cross-sections can also be made in any direction using seismic or well data. Seismic picks of reflectors can be contoured, thereby generating a time horizon map. Time horizon maps can be converted to depth to provide a true scale structural interpretation at a specific level.

Seismic data has been traditionally acquired and processed for the purpose of imaging seismic reflections for structural and stratigraphic interpretation. However, changes in stratigraphy are often difficult to detect on traditional seismic displays due to the limited amount of information that stratigraphic features present in a cross-section view. While working with both time slices and cross-sections provides an opportunity to see a much larger portion of faults, it is difficult to identify fault surfaces within a 3D volume where no fault reflections have been recorded.

Coherence is one measure of seismic trace similarity or dissimilarity. The more two seismic traces increase in coherence, the more they are alike. Assigning a coherence measure on a scale from zero to one, "0" indicates the greatest lack of similarity, while a value of "1" indicates total or complete similarity (i.e., two identical, perhaps time-shifted, traces). Coherence for more than two traces may be defined in a similar way.

One method for computing coherence was disclosed in U.S. Pat. No. 5,563,949 to Bahorich and Farmer (assigned to Amoco Corporation) having a Ser. No. 353,934 and a filing date of Dec. 12, 1994. Unlike the shaded relief methods that allow 3D visualization of faults, channels, slumps, and other sedimentary features from picked horizons, the coherency process devised by Bahorich and Farmer operates on the seismic data itself. When there is a sufficient change in acoustic impedance, the 3D seismic coherency cube developed by Bahorich and Farmer can be extremely effective in delineating seismic faults. It is also quite effective in highlighting subtle changes in stratigraphy (e.g., 3D images of meandering distributary channels, point bars, canyons, slumps and tidal drainage patterns).

Although the process invented by Bahorich and Farmer has been very successful, it has some limitations. An inherent assumption of the Bahorich invention is the assumption of zero mean seismic signals. This is approximately true when the correlation window exceeds the length of a seismic wavelet. For seismic data containing a 10 Hz component of energy, this requires a rather long 100 ms window which can mix stratigraphy associated with both deeper and shallower time horizons. Shortening the window (e.g., to 32 ms) results in higher vertical resolution, but often at the expense of increased artifacts due to the seismic wavelet. Unfortunately, a more rigorous, non-zero mean running window cross correlation process is an order of magnitude more computationally expensive. Moreover, if seismic data is contaminated by coherent noise, estimates of apparent dip using only two traces will be relatively noisy.

Thus, there is a need for methods and apparatus that would overcome the shortcomings of the prior art. In particular, improved resolution and computational speed are desirable. In addition, it would be highly desirable to improve estimates of dip in the presence of coherent noise.

SUMMARY OF THE INVENTION

In accordance with the present invention, a method and an article of manufacture is disclosed for locating subterranean features, faults, and contours. In one embodiment of the invention, the method comprises the steps of: accessing 3D seismic data covering a pre-determined volume of the earth; dividing the volume into an array of relatively small three-dimensional cells, wherein each of said cells is characterized by at least five laterally separated and generally vertical seismic traces located therein; determining in each cell the semblance/similarity of the traces relative to two pre-determined directions; and displaying the semblance/similarity of each cell in the form a two-dimensional map. In one embodiment, semblance/similarity is a function of time, the number of seismic traces within the cell, and the apparent dip and apparent dip azimuth of the traces within the cell; the semblance/similarity of a cell is determined by making a plurality of measurements of the semblance/similarity of the traces within the cell and selecting the largest of the measurements. In addition, the apparent dip and apparent dip azimuth, corresponding to the largest measurement of semblance/similarity in the cell, are deemed to be estimates of the true dip and true dip azimuth of the traces therein. Finally, a color map, characterized by hue, saturation and lightness, is used to depict semblance/ similarity, true dip azimuth and true dip of each cell; in particular, true dip azimuth is mapped onto the hue scale, true dip is mapped onto the saturation scale, and the largest measurement of semblance/similarity is mapped onto the lightness scale of the color map.

In another embodiment of the invention, an article of manufacture is disclosed that comprises a medium that is readable by a computer and that carries instructions for the computer to perform a seismic exploration process. In one embodiment, the computer accesses 3D seismic data covering a pre-determined volume of the earth and the medium instructs the computer to: divide the volume into an array of relatively small three-dimensional cells, wherein each cell is characterized by at least five laterally separated and generally vertical seismic traces located therein; determine in each cell the semblance/similarity of the traces relative to two pre-determined directions; and store the semblance/ similarity of each cell for display in the form a two-dimensional map. In one embodiment, the instructions on the medium define semblance/similarity as a function of time, the number of seismic traces within the cell, and the apparent dip and apparent dip azimuth of the traces within the cell; the semblance/similarity of a cell is determined by making a plurality of measurements of the semblance/ similarity of the traces within the cell and by selecting the largest of the measurements. In addition, the apparent dip and apparent dip azimuth, corresponding to the largest measurement of semblance/similarity in the cell, are deemed to be estimates of the true dip and true dip azimuth of the traces therein. The computer comprises means for producing a color display that is characterized by hue, saturation and lightness; and the medium has instructions to map true dip azimuth onto a hue scale, true dip onto a saturation scale, and the largest measurement of semblance/similarity onto a lightness scale.

The process of the invention is particularly well suited for interpreting fault planes within a 3D seismic volume and for detecting subtle stratigraphic features in 3D. This is because seismic traces cut by a fault line generally have a different seismic character than traces on either side of the fault. Measuring multi-channel coherence or trace similarity along a time slice reveals lineaments of low coherence along these fault lines. Such measures can reveal critical subsurface details that are not readily apparent on traditional seismic sections. Also by calculating trace similarity along a series of time slices, these fault lineaments identify fault planes or surfaces.

The process of the invention presents a multitrace semblance method that is generally more robust in noisy environments than a three trace cross correlation method for estimating seismic coherency. In addition, the semblance process presented in this patent application provides:

higher vertical resolution for good quality data than that of a three trace cross correlation measurement of seismic coherency;

the ability to map the 3D solid angle (dip/azimuth) of coherent events;

the ability to generalize the concept of complex "trace" attributes to one of complex "reflector" attributes; and by combining these enhanced complex trace attributes with coherency and solid angle, the basis of quantitative 3D seismic stratigraphy data attributes that are amenable to geostatistical analysis methods.

Moreover, seismic coherency versus dip maps of picked horizons allow analysis of:

the structural and stratigraphic framework before detailed picking starts;

structural and stratigraphic features of the entire data volume, including zones that are shallower, deeper, and adjacent to the primary zone of interest;

subtle features that are not respresentable by picks on peaks and troughs; and features internal to the top and bottom of formation or sequence boundary picks.

Coupled with coherency, data cubes of the solid angle dip of coherent seismic reflection events allow one to quickly see structural as well as stratigraphic relationships (such as onlap and offlap) between the seismic data and interpreted sequence boundaries.

Numerous other advantages and features of the present invention will become readily apparent from the following detailed description of the invention, the embodiments described therein, from the claims, and from the accompanying drawings.

BRIEF DESCRIPTION OF THE DRAWINGS

FIGS. 15A and 15B depict the results of applying a semblance algorithm and applying dip/azimuth algorithm in accordance with the present invention.

DETAILED DESCRIPTION

Figure 1:
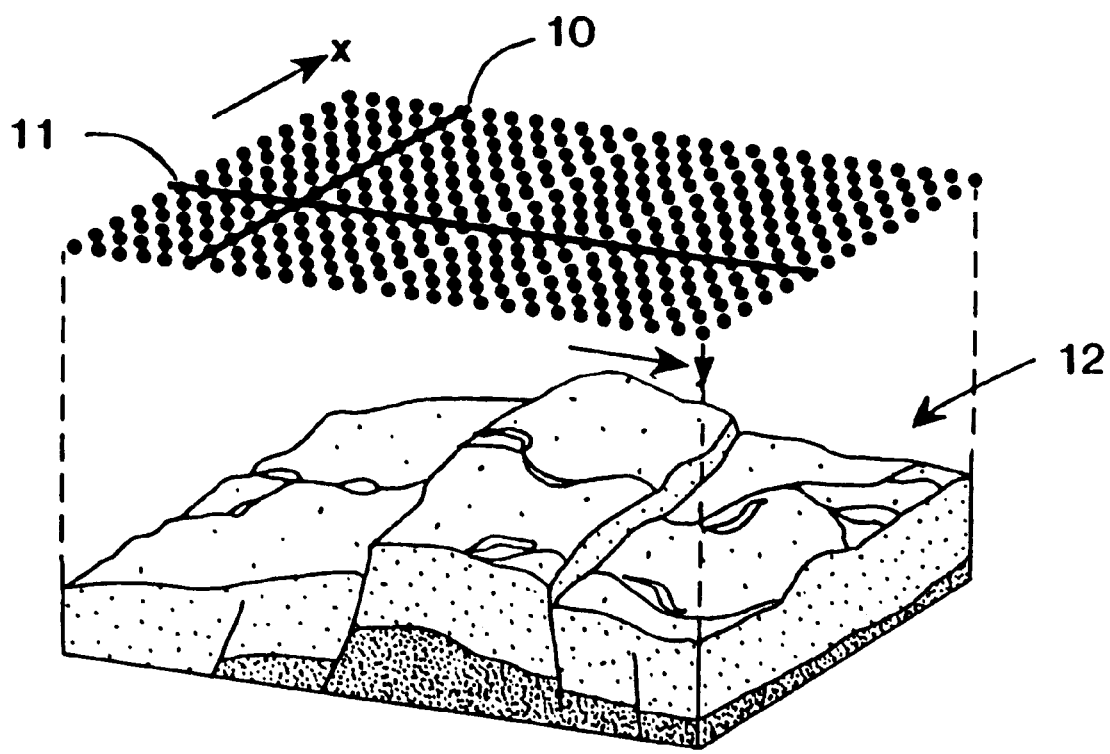
FIG. 1 is a schematic diagram showing an arrangement of geophones to obtain 3D seismic data from the earth's subsurface for processing in accordance with the present invention.
Figure 2:
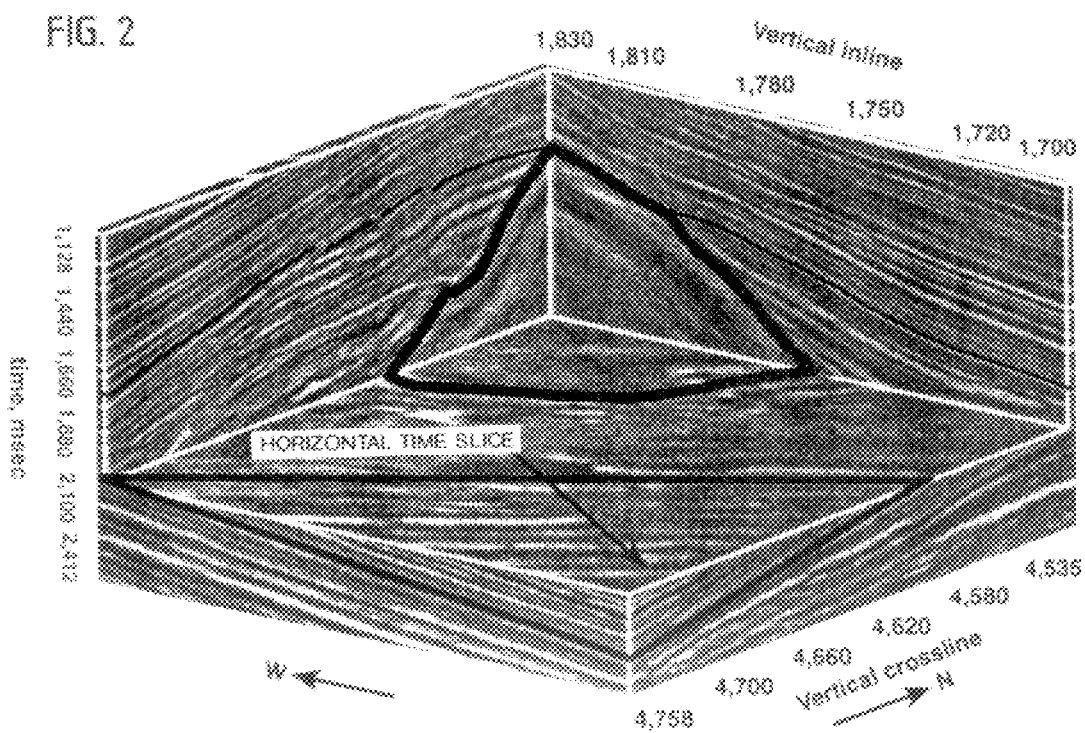
FIG. 2 is a pictorial representation of the information obtained from the data acquired using the arrangement of FIG. 1.
Figure 3:
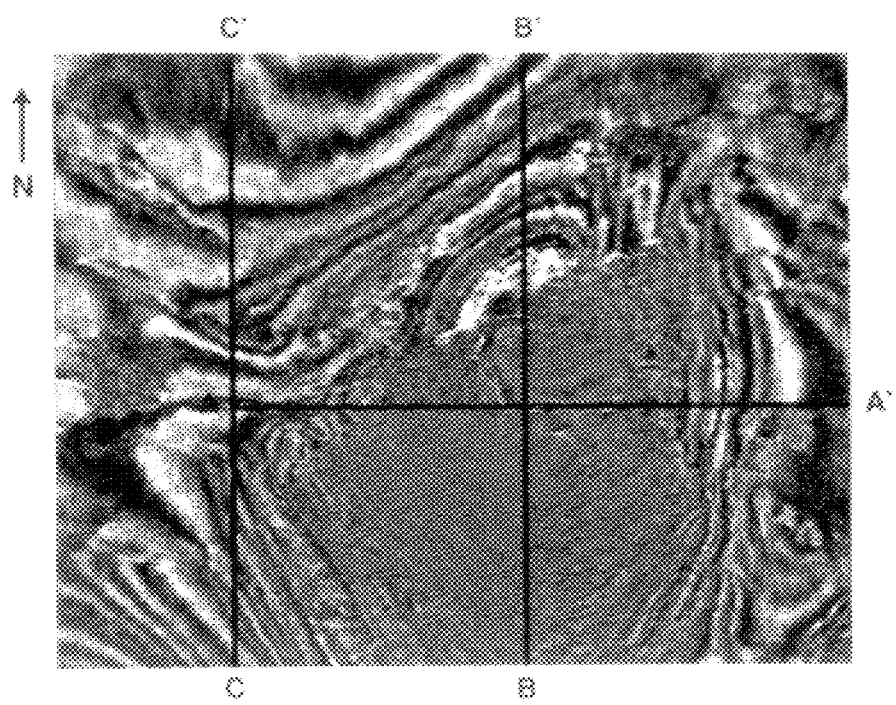
FIG. 3 is a pictorial representation of a horizontal time slice (t=1200 ms) of 3D seismic data processed in accordance with the prior art.

While this invention is susceptible of embodiment in many different forms, there is shown in the drawings, and will herein be described in detail, specific embodiments of the invention. It should be understood, however, that the present disclosure is to be considered an exemplification of the principles of the invention and is not intended to limit the invention to any specific embodiment or algorithm described herein.

Figure 16A:
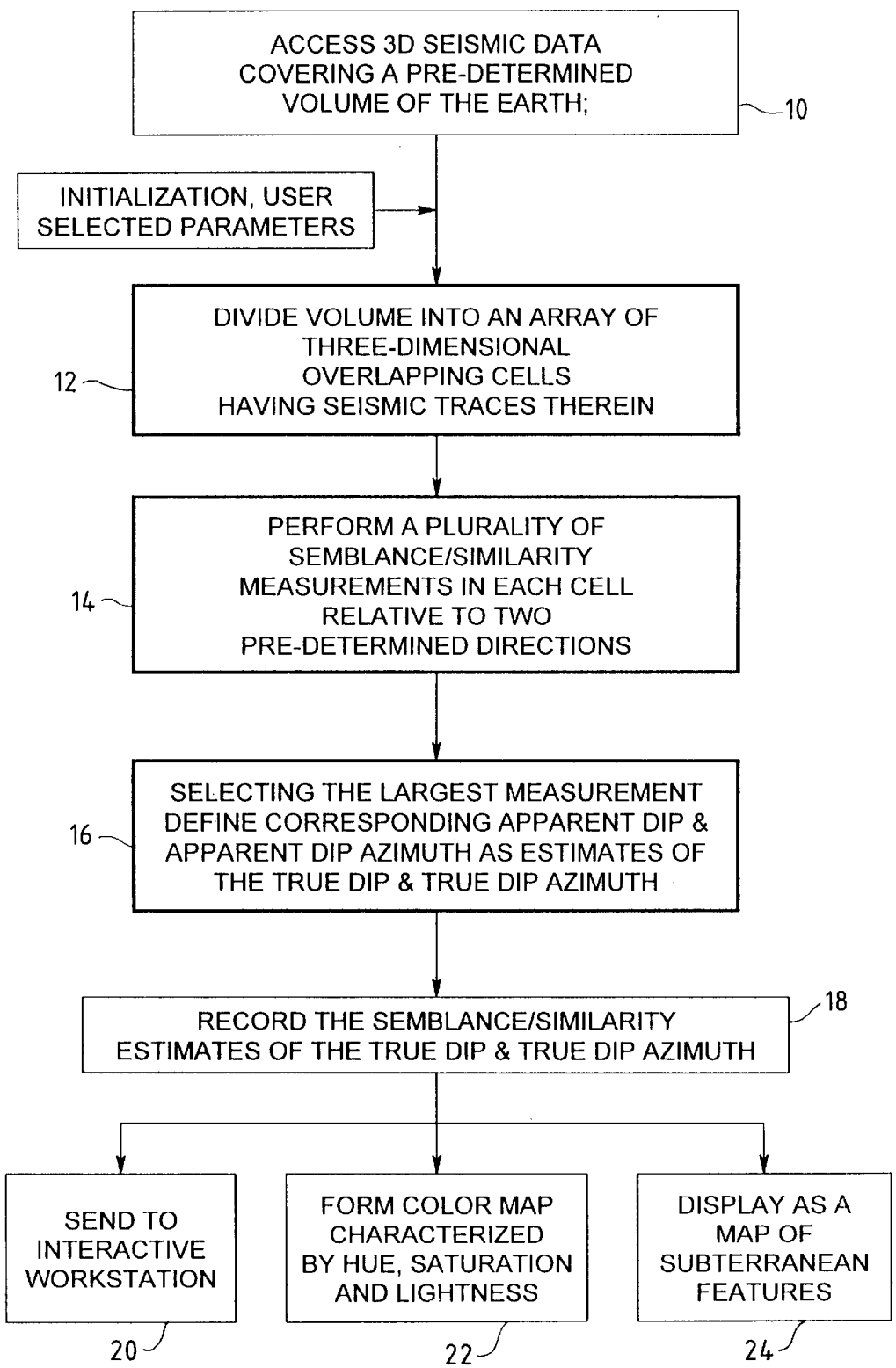
FIGS. 16A and 16B are schematic diagrams depicting the processing flow of the steps performed in one embodiment of the invention.

Before describing the invention in detail, an overview will be given so that the detailed description, which follows, may be better understood. One embodiment of the process of the invention is illustrated in FIG. 16A. Briefly, the method comprises the steps of: accessing 3D seismic data 10 covering a pre-determined volume of the earth; dividing 12 the volume into an array of relatively small three-dimensional cells, wherein each of said cells is characterized by at least five laterally separated and generally vertical seismic traces located therein; determining 14 in each cell the semblance/similarity of the traces relative to two pre-determined directions; selecting 16 the largest of the measurements; and displaying 24 the semblance/similarity of each cell in the form a two-dimensional map. The semblance/similarity measurements may be recorded 18 for future use, or sent 20 to an interactive workstation for further analysis; or printed or displayed as a color map 22, characterized by hue, saturation and lightness, may be used to depict semblance/similarity, true dip azimuth and true dip of each cell.

The first step of the process (See FIG. 16A) is to obtain a set of seismic data in the form of seismic signal traces distributed over a three dimensional volume of the earth. Methods by which such data is obtained and reduced to digital form for processing as 3D seismic data are known to those skilled in the art.

The Semblance Process

The next step is to generate a "coherence cube." This is done by applying a multi-trace semblance algorithm to the 3D seismic data. This algorithm may take many forms. Whatever its form, its function is to compare the similarity of nearby regions of seismic data within the 3D seismic volume. This value (or attribute) serves as a rather robust estimate of signal discontinuity within geologic formations, as well as signal discontinuities across faults and erosional unconformities.

We define an analysis grid (or computational star) to be either an elliptical or rectangular pattern of "J" traces centered about a given output trace (See FIGS. 4A through 4H).

Figure 4A:
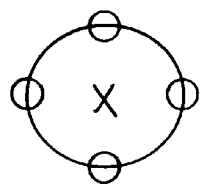
FIGS. 4A through 4H illustrate various analysis windows (computational stars) that may be used in running window analysis of seismic coherence, dip and dip azimuth.
Figure 4B:
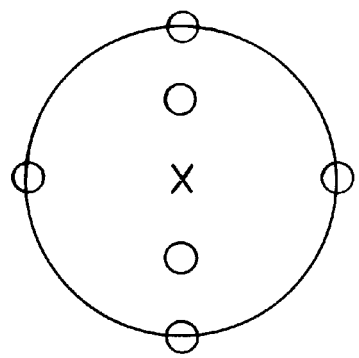
Figure 4C:
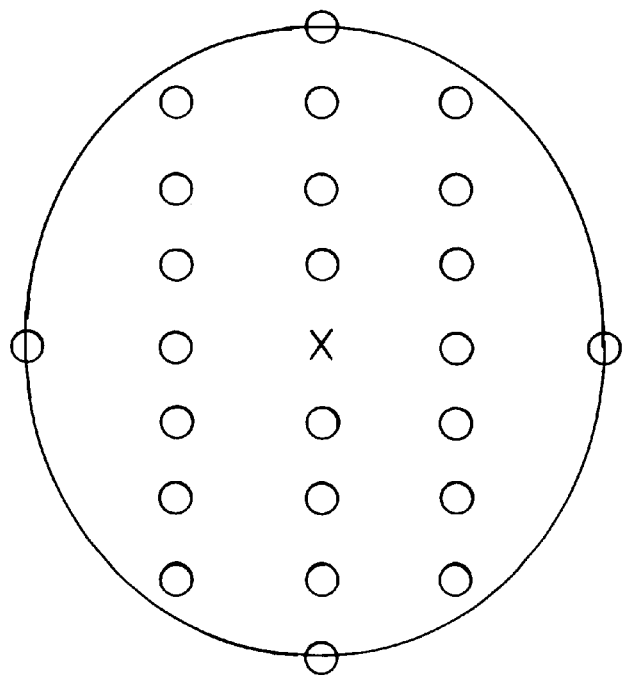
Figure 4D:
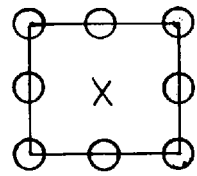
Figure 4E:
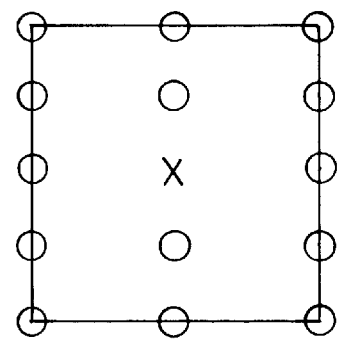
Figure 4F:
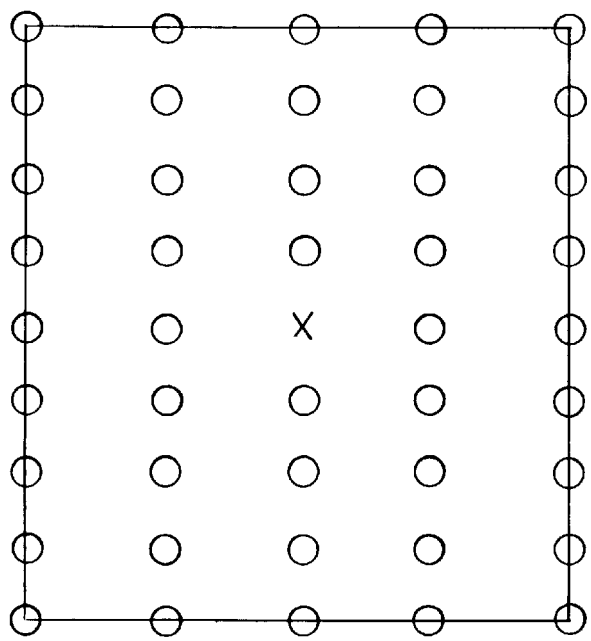

In the drawings, "X" denotes the center of the analysis window while "O" denotes additional traces used in the semblance calculation. Minimum size circular and rectangular windows used to analyze data with equal trace spacings ($\Delta x = \Delta y$) are shown in FIGS. 4A and 4D. Minimum circular and rectangular windows used to analyze data with trace spacing in the cross-line/strike (y) direction twice that in the in-line/dip (x) direction ($\Delta y = 2\Delta x$) are shown in FIGS. 4B and 4E. Such nonequal spacings are commonly used to exploit the slower change of geology in the strike direction. Larger analysis windows used for greater resolution of reflector dip and azimuth, or to increase signal to noise ratio in poor data areas, are shown in FIGS. 4C and 4F.

Figure 4G:
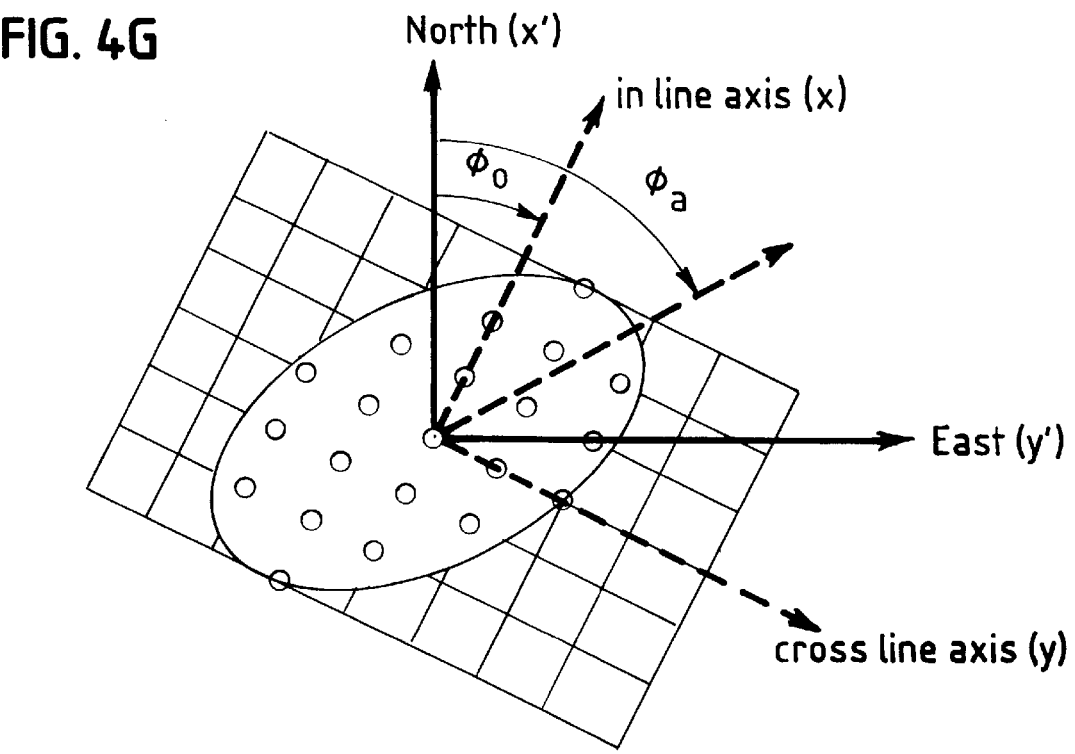
Figure 4H:
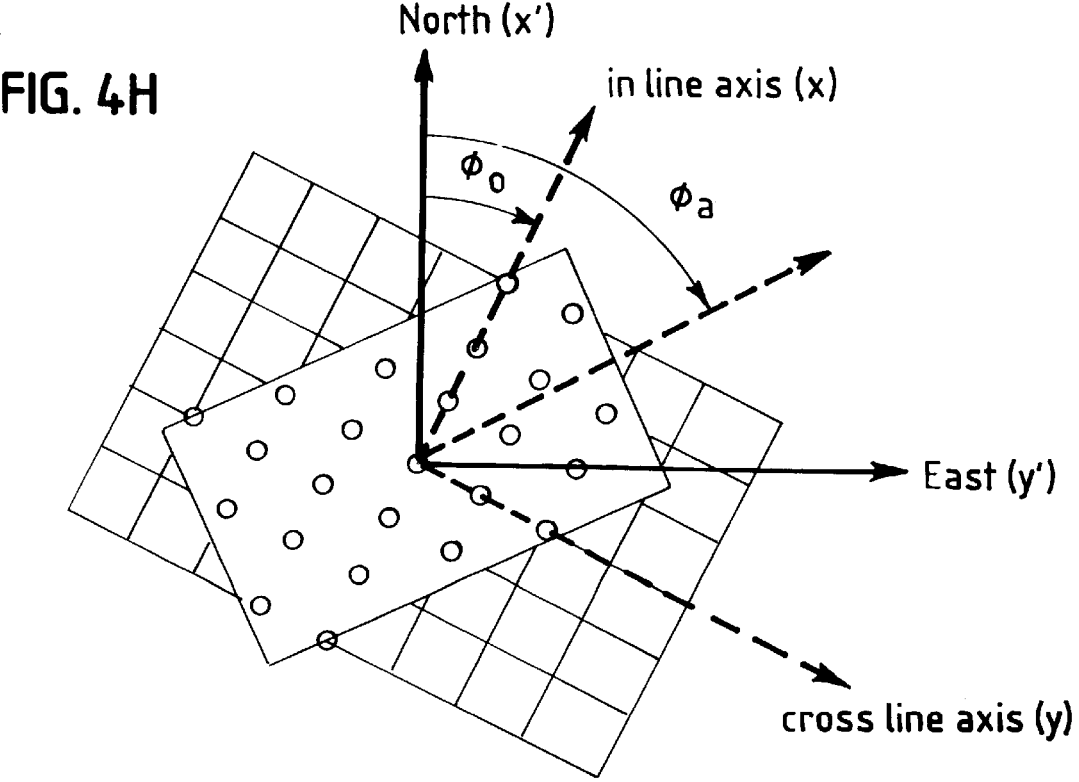

Elliptical and rectangular analysis windows centered about an analysis point defined by a major axis, a minor axis, and the azimuth of major axis are shown in FIGS. 4G and 4H. The acquisition (x,y) axes are rotated by $\phi_0$ degrees from the North-East (x', y') axes. Such assymmetric windows are useful in fracture detection.

If we center the (x, y) axis about the center of an analysis window containing J seismic traces, $u_j(t, x_j, y_j)$, we define the semblance $\sigma(\tau,p,q)$ to be:

$$\sigma(\tau, p, q) = \frac{\left\{\sum_{j=1}^{J} u[\tau - (px_j + qy_j), x_j, y_j]\right\}^2}{J \sum_{j=1}^{J} \{u[\tau - (px_j + qy_j), x_j, y_j]\}^2} \quad (1)$$

where the triple ($\tau$,p,q) defines a local planar event at time $\tau$, and p and q are the apparent dips in the x and y directions measured in ms/m. Since, p=d sin $\phi$ and q=d cos $\phi$, where d is the true dip and $\phi$ is the dip azimuth, it follows that:

$$u_j(\tau,p,q,x,y) = u_j[\tau - d(x \sin\phi + y \cos\phi), x, y].$$

Those skilled in the art will recognize that, in the denominator of equation (1), J serves as a normalization factor. The numerator represents the average energy and the summation term in the denominator represents the total energy of the traces. In effect, equation (1) is representative of a ratio of coherent and incoherent energy.

Figure 5:
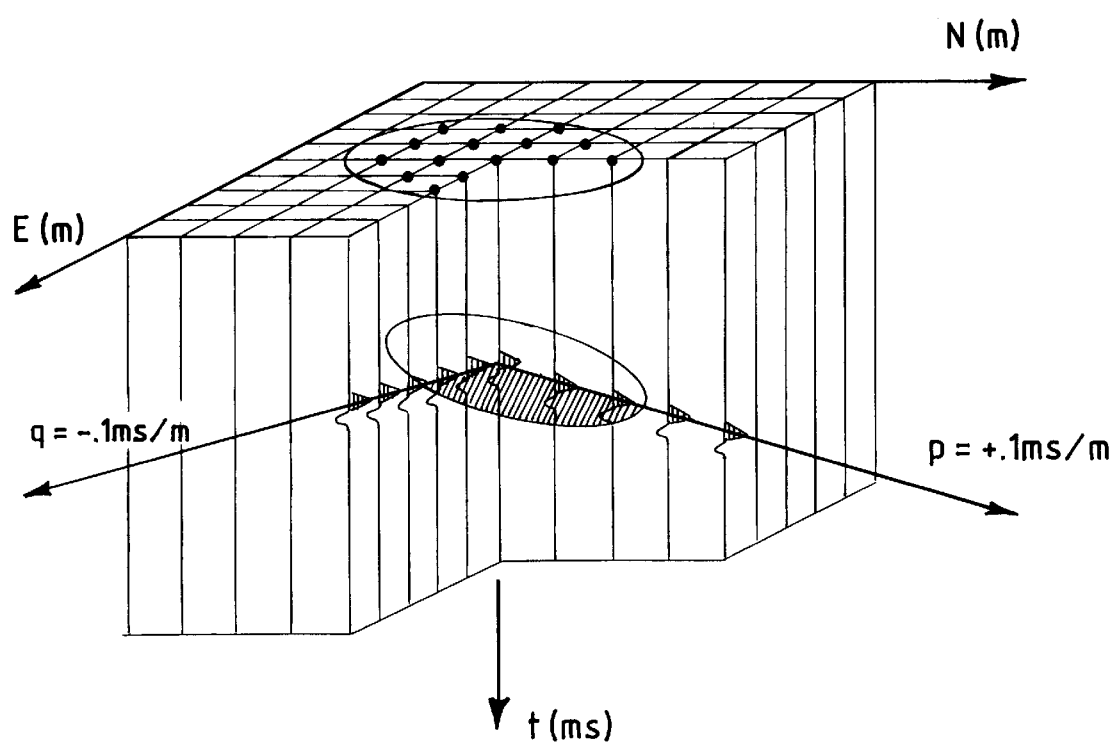
FIG. 5 is a pictorial representation of the process of the invention using an elliptical window centered about an analysis point.

The objective is to perform a simultaneous 2D search (See FIG. 5) over apparent dips (p,q) in the in-line and cross-line directions. However, the semblance estimate given by equation (1) will be unstable for small but coherent values of seismic events, such as might occur if we were to sum along the zero crossings of a plane coherent wavelet. To avoid this, we estimate the coherence c ($\tau$,p,q) at time $\tau$ and apparent dips (p,q) to be the average semblance over a time window (or vertical analysis window of height 2 w ms of half length K=w/$\Delta$t samples):

$$c(\tau, p, q) = \frac{\sum_{k=-K}^{+K} \left\{\sum_{j=1}^{J} u[\tau + k\Delta t - (px_j + qy_j), x_j, y_j]\right\}^2}{J \sum_{k=-K}^{+K} \sum_{j=1}^{J} \{u[\tau + k\Delta t - (px_j + qy_j), x_j, y_j]\}^2} \quad (2)$$

In general, we do not know but wish to estimate that value of (p,q) associated with the local dip and azimuth of a hypothetical 3D reflection event.

Figure 6A:
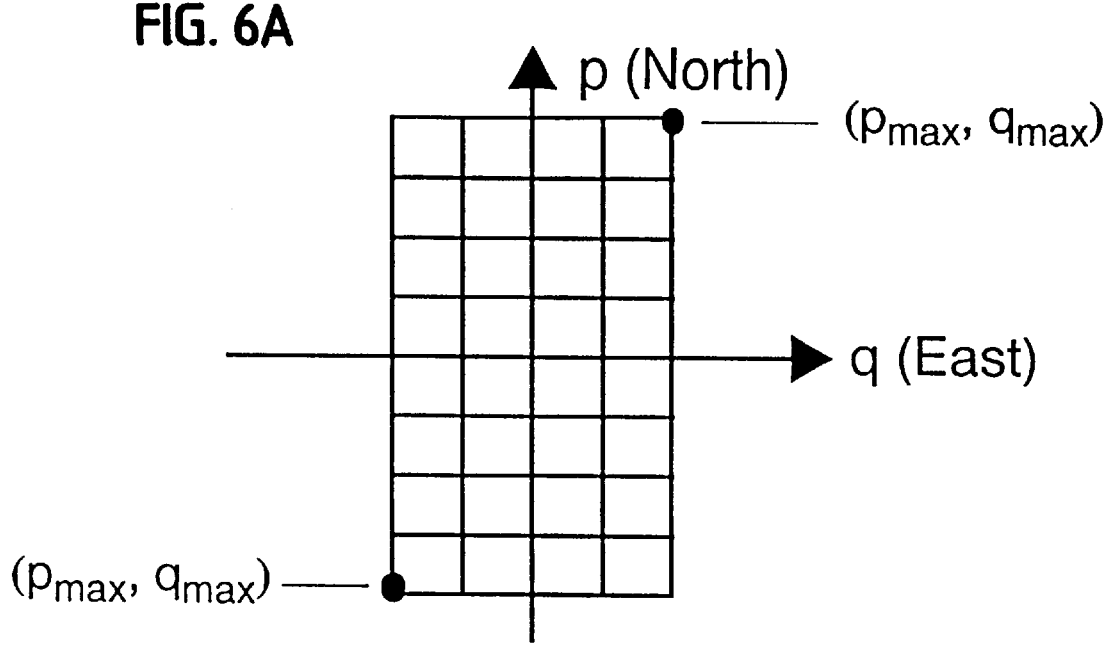
FIGS. 6A and 6B are examples of a rectangular dip/ azimuth tessellation useful when analyzing a survey having strikes and dips parallel to the acquisition axes, and when illuminating faults cutting perpendicular to a dominant reflector strike and dip ($p_0$, $q_0$)
Figure 6B:
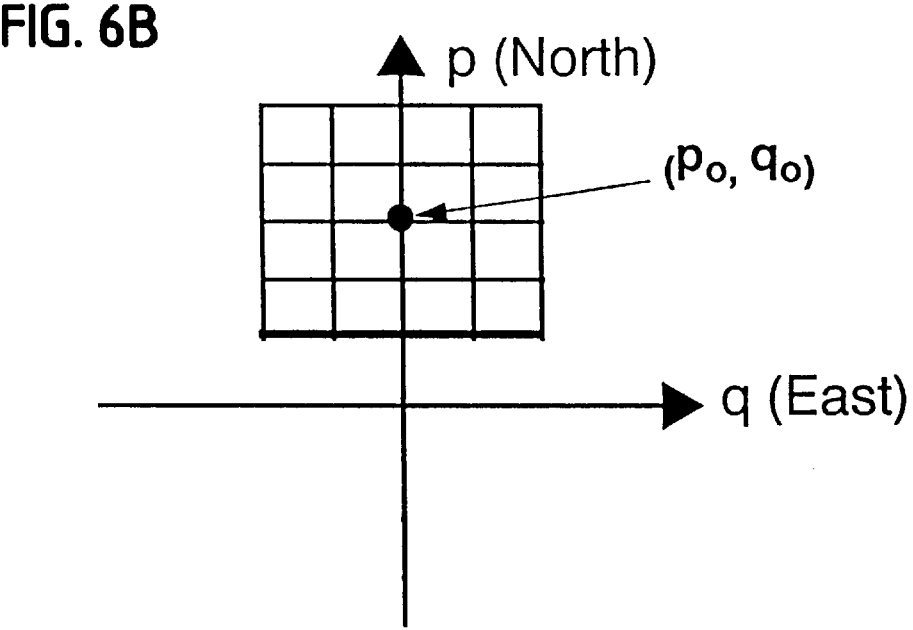

In one embodiment of the process of the invention, we estimate (p,q) through a brute force search over all possible apparent dips (See FIGS. 6A and 6B). We assume that the interpreter is able to estimate the maximum true dip, $d_{max}$ (measured in ms/m) from conventional seismic displays of the data (e.g., vertical data slices), thereby limiting the dips to be:

$$\sqrt{p^2 + q^2} \leq +d_{max}.$$

If $x_{max}$ and $y_{max}$ are the half width and half length of a rectangular analysis window, and if $f_{max}$ is the highest temporal frequency component contained in the seismic data, then the Nyquist criterion of sampling the data at two points per period restricts the apparent dip increments, $\Delta p$ and $\Delta q$, to:

$$x_{max}\Delta p \leq 1/(2f_{max}), \text{ and } y_{max}\Delta q \leq 1/(2f_{max}).$$

It should be noted that the Nyquist criterion is valid for linear operations on the seismic data; and that equation (2)

is nonlinear. In practice, we have found it necessary to limit $\Delta p$ and $\Delta q$ to half that required by the Nyquist sampling criterion to obtain an accurate semblance for a coherent dipping event.

Thus, our search for an estimate of the apparent dip $(\hat{p}, \hat{q})$ of a seismic reflector is reduced to the calculation of semblance $c(p_l, q_m)$ over $n_p^* \ n_q$ discrete apparent dip pairs $(p_l, q_m)$ where:

$$n_p = (2d_{max}/\Delta p) + 1, \text{ and}$$

$$n_q = (2d_{max}/\Delta q) + 1.$$

The apparent dip pair $(p_l, q_m)$ is deemed to be an estimate of the reflector apparent dips when:

$$c(\hat{p}, \hat{q}) \geq c(p_l, q_m) \quad (3)$$

for all $-n_p < 1 \leq +n_p, -n_1 \leq m \leq +n_1$.

The estimated apparent dips $(\hat{p}, \hat{q})$ are related to the estimated true dip $\hat{d}$ and dip azimuth $\hat{\phi}$ by the simple geometric relationships:

$$\hat{p} = \hat{d} \sin\hat{\phi}; \text{ and}$$

$$\hat{q} = \hat{d} \cos\hat{\phi},$$

where $\hat{d}$ is measured in ms/m and the angle $\hat{\phi}$ is measured clockwise from the positive x' (or North) axis. A simple coordinate rotation by angle $\phi_0$ is necessary when the in-line acquisition direction x is not aligned with the N-S (x') axis (See FIG. 4G).

Solid Angle Discretization and Display

Optimal angular discretization is important for two reasons: minimization of computational cost, and limitation on the number of colors that can be displayed using commercial interpretation workstation software (e.g., currently 64 with Landmark's "Seisworks" and 32 with Geoquest's "IESX" systems).

Figure 7A:
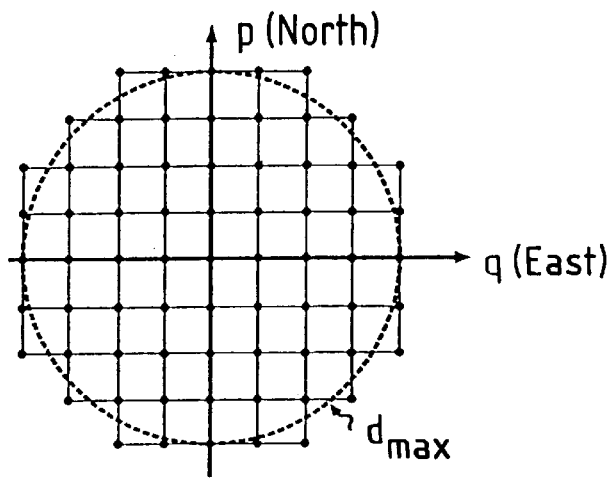
FIGS. 7A through 7C are pictorial representations of three tesselations of solid angle dip/azimuth space.
Figure 7B:
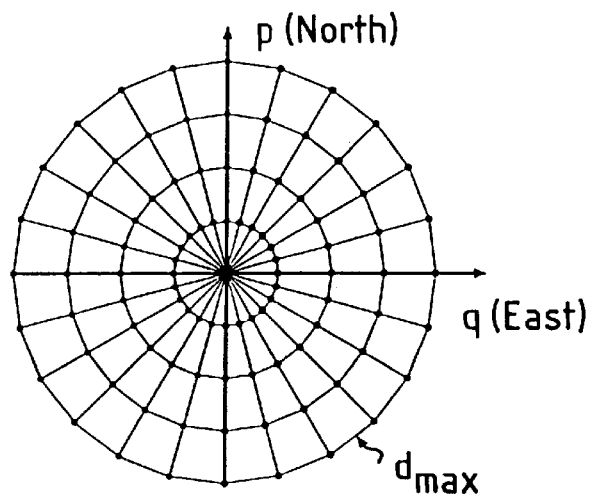
Figure 7C:
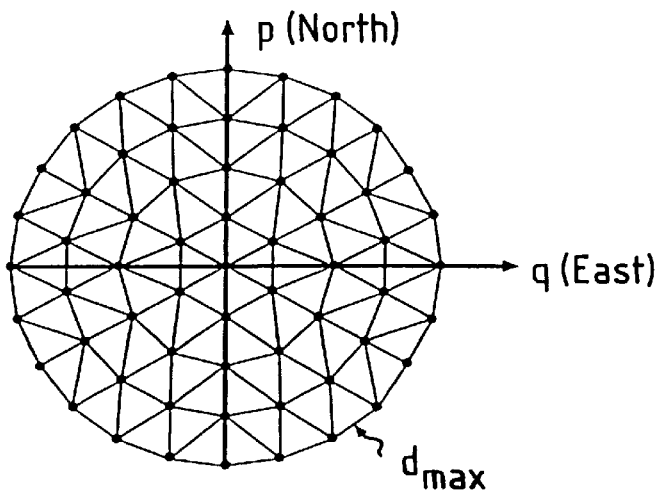

FIG. 7A shows the discretization of apparent dip using equal increments $\Delta p$ and $\Delta q$ in a rectangular grid of 69 angles. FIG. 7B shows the discretization using equal increments $\Delta d$ and $\Delta \phi$ in a radial grid of 97 angles. Clearly, we do not wish to sample the dip d=0 ms/m for ten different azimuths. The "Chinese Checker" tessellation of FIG. 7C more closely represents an equal and therefore more economic sampling of the $(d, \phi)$ surface with a minimum number of points (i.e., 61 angles). Each tesselation of FIGS. 7A and 7C represents an approximately equal patch of solid angle $\Delta \Omega$. For the angular discretization shown in FIG. 7C and for a circular analysis radius, a, the incremental dip $\Delta d$ is chosen to be:

$$a\Delta d \leq \frac{1}{2f_{max}}. \quad (4)$$

Display

While it is possible to independently map semblance, dip, and azimuth, it is clear that the latter two attributes are coupled to each other. Furthermore, the confidence we have in these estimates is proportional to the coherency/semblance. Others (See U.S. Pat. No. 4,970,699 to Bucher et al. and assigned to Amoco Corporation, "Method for Color Mapping Geophysical Data") have shown that the color HLS (hue, lightness, saturation) model can be quite effective in displaying multicomponent seismic attributes (Also see Foley, J. D. and Van Dam, A., 1981, *Fundamentals of Interactive Graphics,* Addison-Wesley, Reading, Mass.).

Figure 8A:
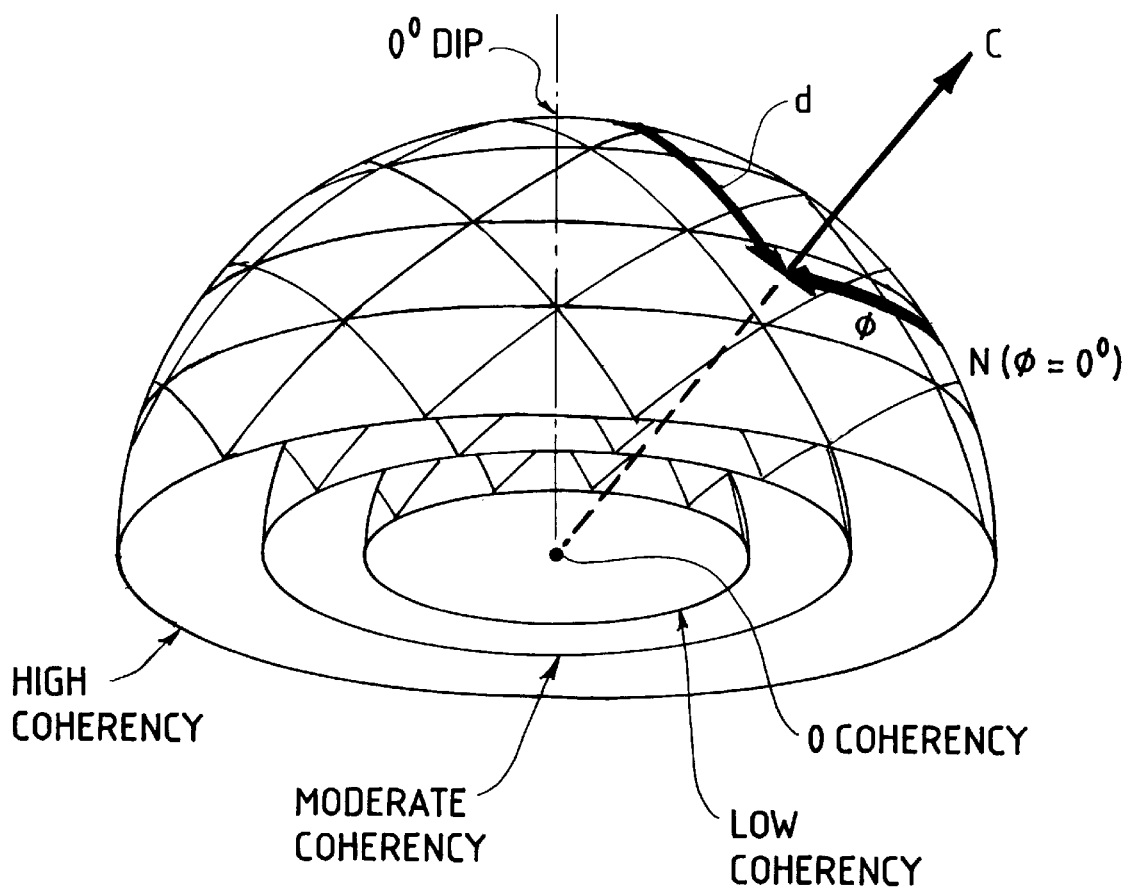
FIGS. 8A through 8D depict the mapping of 3D seismic attributes ($\phi$,c,d) to 3D color space (H,L,S)
Figure 8B:
Figure 8C:
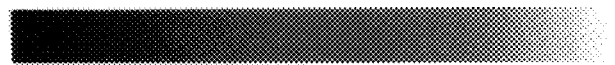
Figure 8D:

Refering to FIGS. 8A through 8D, in this scheme, we directly map azimuth, $\phi$, onto the hue axis H:

$$H = \phi$$

where both H (commonly known as the "color wheel") and $\phi$ vary between −180 and +180 degrees (See FIG. 8B). Blue corresponds to North, salmon to East, yellow to South, and forest green to West azimuth. Azimuths corresponding to zero dip are arbitrarily assigned a value of 0 degrees (North) and are thus plotted as blue.

Next, we map (See FIG. 8C) average semblance/coherency c, onto the lightness axis L:

$$L = \alpha c,$$

where $$0 \leq L \leq 100,$$

$$0 \leq c \leq 1.0, \text{ and}$$

$\alpha$ is a scale constant less than 100, since changes in hue and saturation near L=0 (black) and L=100 (white) are difficult to distinguish. White, or L=100, corresponds to high semblance or c=1, while black, or L=0, corresponds to low semblance, c=0. Intermediate semblances correspond to intermediate shades of gray, (such as silver, gray and charcoal gray). Lightness (sometimes referred to as "brightness") expresses the amount of illumination. It represents a gray scale ranging from black to white.

Finally, we map dip d onto the saturation axis S:

$$S = 100 \ d/d_{max}$$

The saturation (S=0) and hue chosen are arbitrary; we could just as easily have displayed this attribute for a value of (H=0, S=100) giving us semblance displayed as white, pastel blue, pure blue, midnight blue and black. Saturation expresses the lack of dilution of a color by white light. A fully saturated color has no white added; adding white "washes out" the color without changing its hue. (See FIG. 8D).

Figure 9:
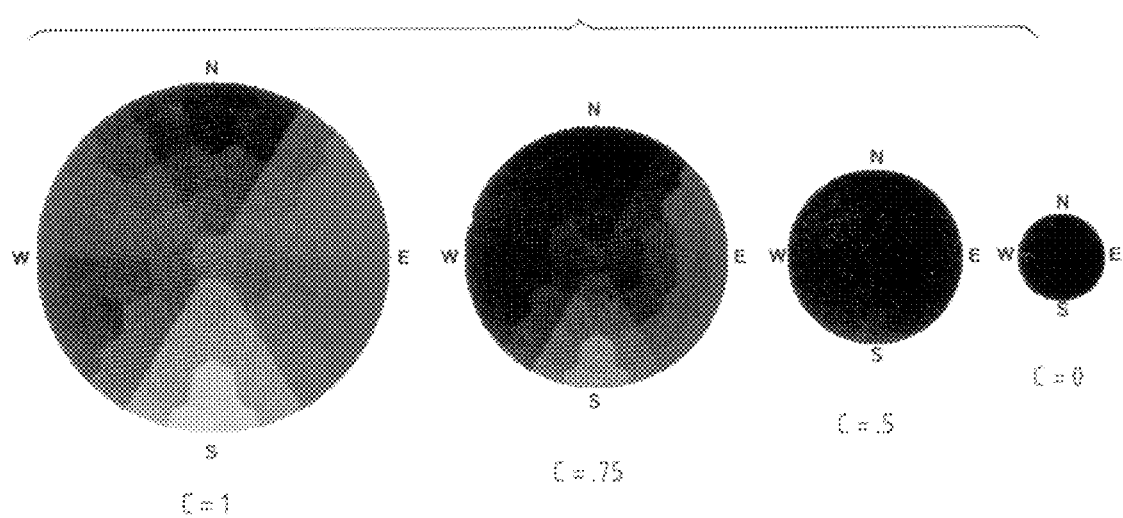
FIG. 9 shows four surfaces through the color hemisphere of FIG. 8A for four values of coherence.

FIG. 9 illustrates four constant surfaces through the 3D (H,L,S) color hemisphere of $(\phi, c, d)$ shown in FIG. 8A, corresponding to c=1.00, c=0.75, c=0.50 and c=0.00.

Appendix 1 describes the color scheme in greater detail. Some advantages of the HLS color model are: azimuth is cyclic and maps neatly to the cyclic color wheel (hue); the azimuths corresponding to d=0 are meaningless; all azimuths converge smoothly to gray for shallow dips; and lower confidence in estimating dip and azimuth in zones of weak, low semblance (such as across faults) is indicated by darker colors.

Implementation of Mathematical Process

Figure 16B:
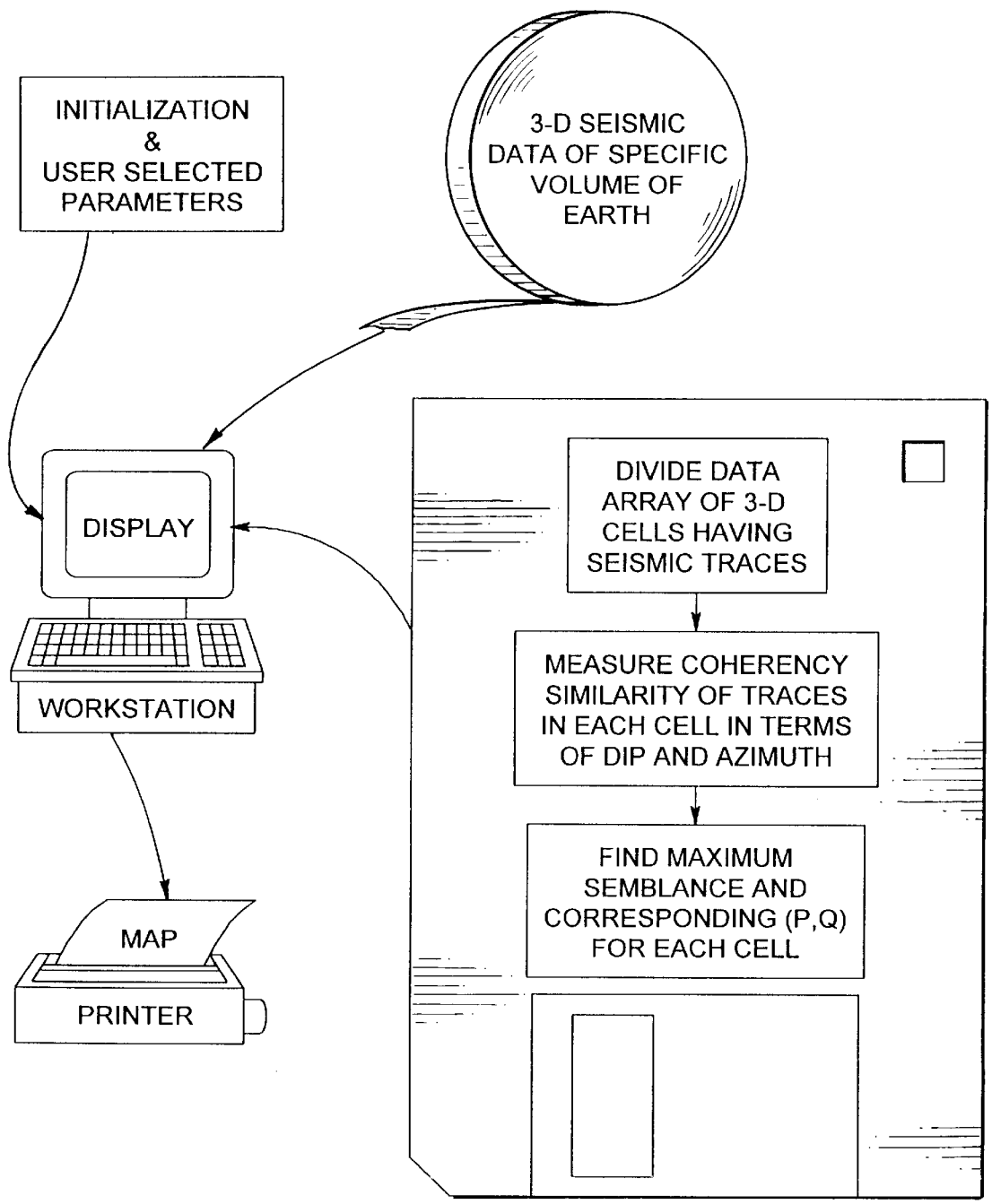

Landmark and GeoQuest interpretive workstations (See FIG. 16B), for example, can be used to view and interpret faults and stratigraphic features by loading the processed data as a seismic volume. Visualization software (e.g., Landmark's SeisCube software) may be employed to rapidly slice through the seismic volume to aid in understanding complex fault relationships.

Computer Program

A FORTRAN 77 program was written to perform the calculations and provide the information for the displays previously described. Additional details are given in Appendix 2. Each trace $U_{MN}$ is accessed by its in-line and cross-line indices, M and N. The user specifies a rectangular or an elliptical spatial analysis window or cell about each point/trace in the input data set (See FIG. 4G). The major and minor axis of this analysis window, a and b are given by a=aplength and b=apwidth. The orientation or azimuth of the major axis $\phi_a$ is given by $\phi_a$=apazim. A rectangular analysis window (FIG. 4H) is indicated by specifying –R on the command line. The 2J indices relative to the center of this analysis window (and corresponding to the traces that fall within this window) are tabulated as a simple list, with m(j) and n(j) indicating the trace index (relative to the analysis trace $U_{MN}$) in the x and y directions, respectively. The program performs a simultaneous 2D search over apparent dips (p,q) in the in-line and cross-line directions, where $(p^2+q^2)^{1/2}$<+smax. The increments dp and dq are chosen such that the data are sampled at four points per period =1/(fref) at the edge of the analysis window. For interpretation, it may be convenient to express each apparent dip pair (p,q) in spherical coordinates as a true (time or depth) dip d and dip azimuth $\phi$.

The data in the analysis window are interpolated to the fractional time, τ–px–qy, for each trial dip and azimuth (See FIG. 5), in essence, "flattening" the data. The semblance for this trial dip at the analysis point is defined to be the semblance of these flattened traces in the analysis window.

For time domain data, we flatten the jth trace about the analysis point (M,N) by:

$$u_f(\tau,p,q,x,y)=u[\tau-(px+qy)]=u[\tau-d(x\sin\phi+y\cos\phi)].$$

where x and y are distances measured from the center of the analysis window. This may be expressed:

$$u^f_{M+m(j),N+n(j)}(\tau,p,q)=u_{M+m(j),N+n(j)}[\tau-(pn_{(j)}\Delta x+qm(j)\Delta y]$$

where Δx and Δy are the in-line and cross-line trace spacings.

For depth domain data we flatten the jth trace using:

$$j_f(\zeta,p,q,x,y)=u[\zeta-(px+qy)]=u[\zeta-d(x\sin\phi+y\cos\phi)].$$

The semblance is then calculated for all subsequent dips and azimuths using:

$$\sigma(\tau,p,q) = \frac{\left(\sum_{j=1}^{J}[u_f(t,p,q,x_j,y_j)]\right)^2}{J\sum_{j=1}^{J}[u_f(t,p,q,x_j,y_j)]^2} \quad (5)$$

As in velocity analysis, the semblance for each dip, azimuth and analysis point are smoothed by forming a running window time integration over the partial sums from –K to +K where K=apheight/dt. We therefore define the coherence, c(τ,p,q) to be:

$$c(\tau,p,q) = \frac{\sum_{-K}^{+K}\left(\sum_{j=1}^{+J}[u_f(t,p,q,x,y)]\right)^2}{J\sum_{-K}^{+K}\sum_{j=1}^{J}[u_f(t,p,q,x,y)]^2} \quad (6)$$

That dip and azimuth pair $\Omega$=(d, $\phi$) which has the maximum (running window integrated) coherency c is taken to be an estimate of the coherency, $\bar{c}$, dip and azimuth ($\hat{d}$, $\hat{\phi}$) for the analysis point.

EXAMPLES

Figure 10A:
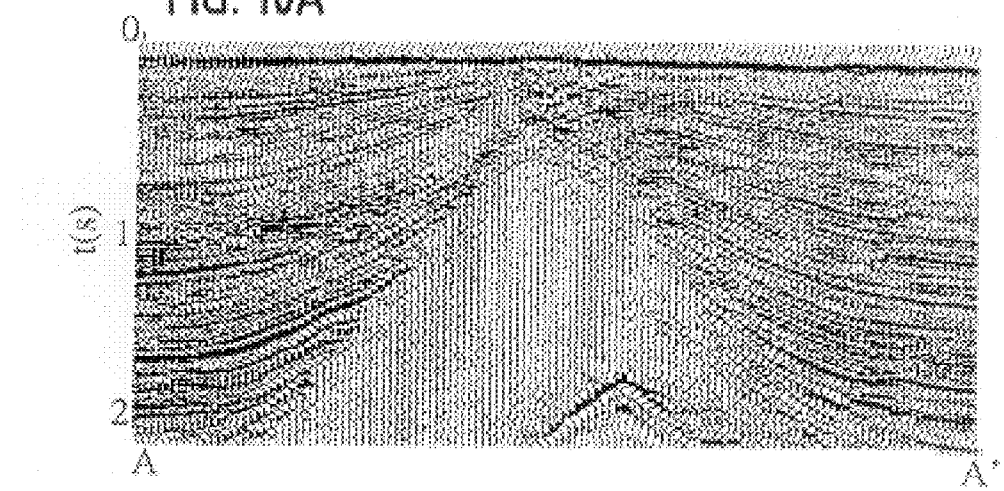
FIGS. 10A through 10C depict ordinary vertical slices of the seismic data of FIG. 3.
Figure 10B:
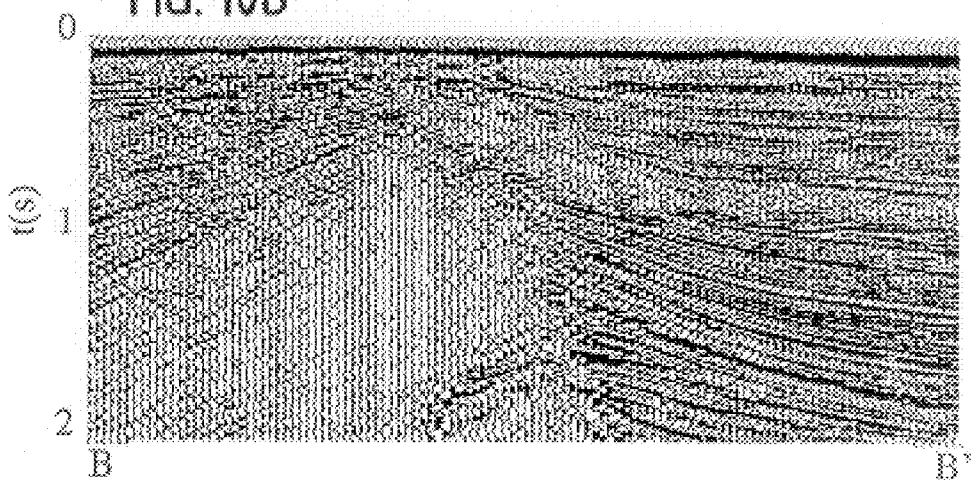
Figure 10C:
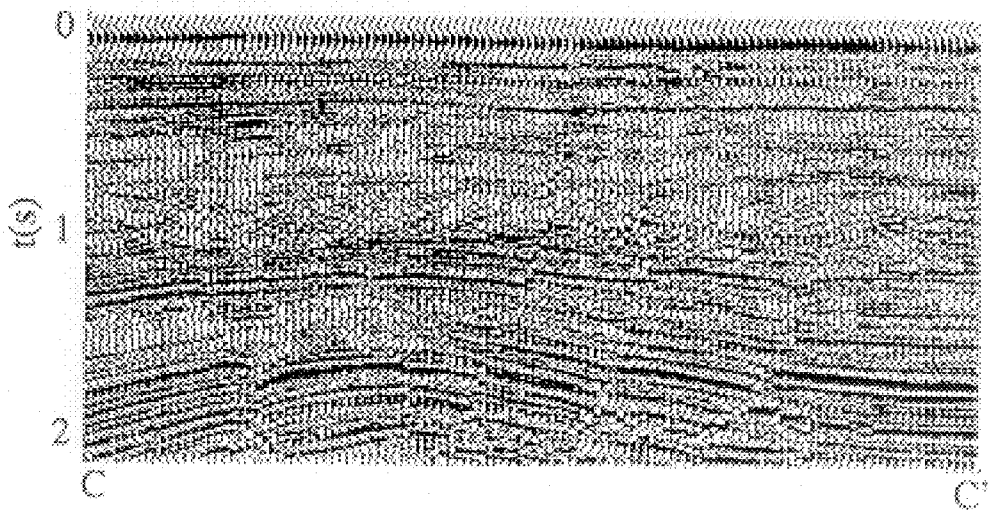
Figure 11A:
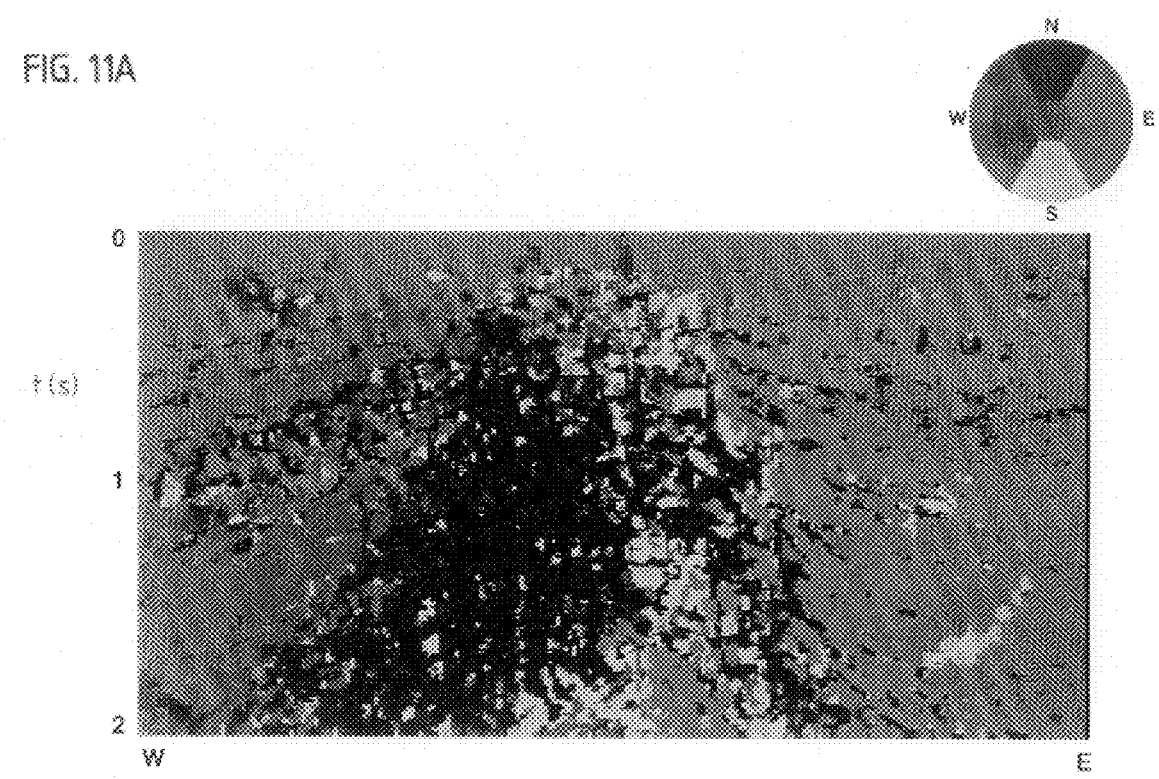
FIGS. 11A through 11C depict the seismic attributes, dip, dip azimuth and coherency obtained by applying the process of the invention, to data corresponding to that of FIGS. 10A through 10C.
Figure 11B:
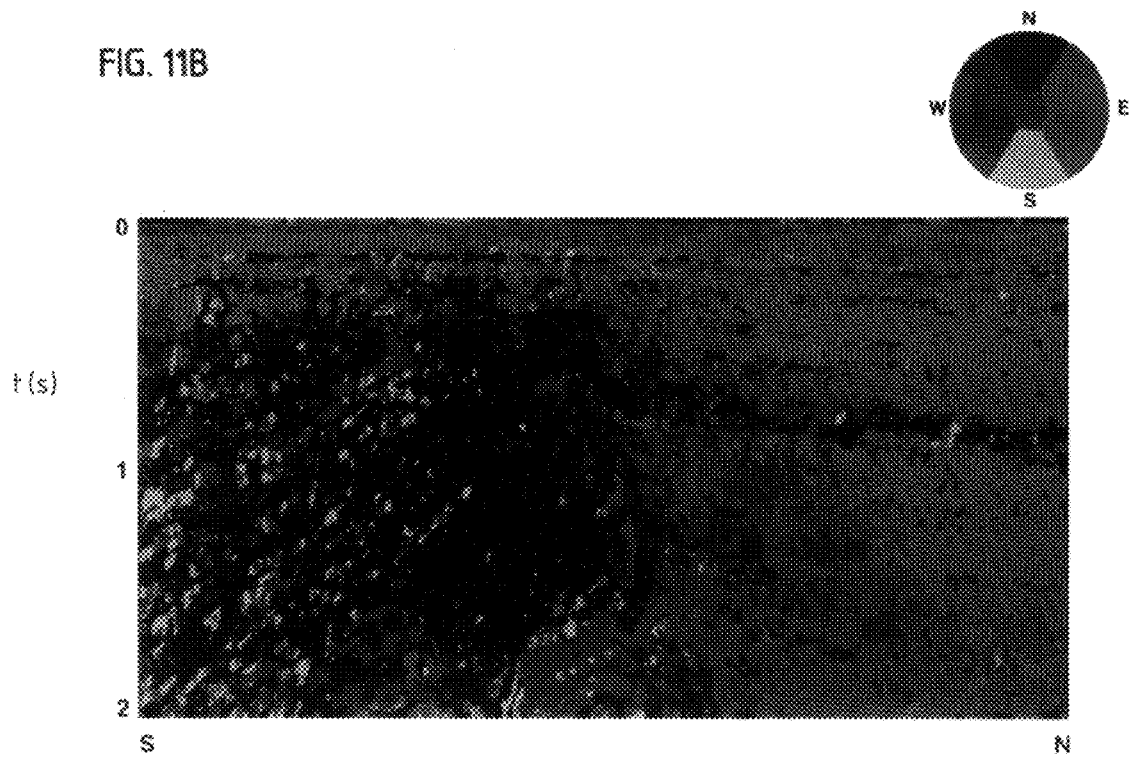
Figure 11C:

FIGS. 11A through 11C are displays of the 3D seismic attributes ($\phi$, c, d) corresponding to FIGS. 10A through 10C using the semblance based coherency algorithm expressed by equation (6), and the color display technique depicted in FIGS. 8 and 9. The input data were temporarily sampled at 4 ms, have an in-line trace spacing of Δx=12.5 m, and have a cross-line trace spacing of Δy=25 m, with the in-line acquisition oriented along a N-S axis. For FIGS. 11A through 11C, a circular analysis window or cell of a=b=60 m was used (See FIG. 4A), so as to include a total of 11 traces in the calculation. The maximum search dip (See FIG. 7C) was $d_{max}$=0.25 ms/m, giving rise to 61 search angles. The temporal integration time used was w=16 ms, or K=4, thereby averaging the semblance calculation over 9 samples.

In FIGS. 10A and 10B lines AA' and BB' were chosen as S to N and W to E vertical slices through the center of a salt dome. Line CC' is an offset S to N line and illustrates the appearance of radial faults on a vertical slice. In FIGS. 11A through 11C, the interior of the salt dome is represented by dark colors, corresponding to an area of generally low coherency. Low areas of coherency correspond to the radial faults seen on line CC'. Coherent, flat dips are represented as light gray and dominate the section away from the salt dome, in particular line CC'. The blue color on the north side of the salt dome (seen on N-S line AA') corresponds to sediments dipping steeply (d=$d_{max}$) to the North. These dips become progressively shallower away from the salt dome, and are thus displayed first as blue (saturation, S=100.0), cadet blue (S=0.75) and steel blue (S=0.50), before they flatten and are displayed as gray (S=0.0). The yellow color on the south side of the salt dome (seen on line AA') corresponds to sediments dipping steeply to the South. The salmon color on the East flank of the salt dome (shown on the E-W line BB') corresponds to sediments dipping steeply to the East. These dips also become progressively shallow away from the salt dome, and are displayed first as salmon (S=100.00), through sienna (S=50.0), and finally to gray, corresponding to flat dip. Finally, the forest green color on the West flank of the salt dome (shown on line AA') corresponds to sediments dipping steeply to the West. These dips also flatten away from the salt dome and are displayed using the colors shown on the West part of the legend shown in FIG. 9. N-S line CC' is not aligned radially with the salt dome. Thus, out-of-the-plane rotation of different fault blocks are depicted, with the green block corresponding to dips to the SW and the cyan block with dips to the NW.

Figure 12A:
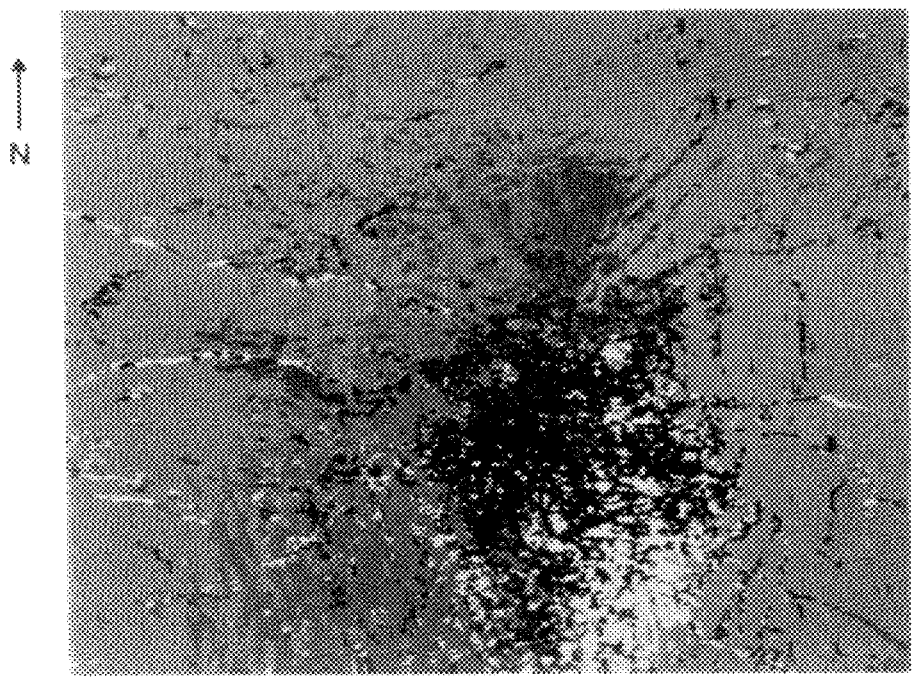
FIGS. 12A and 12B are time slices (t=1200 ms and t=1600 ms) through the dip azimuth cube giving rise to FIGS. 11A and 11B.
Figure 12B:
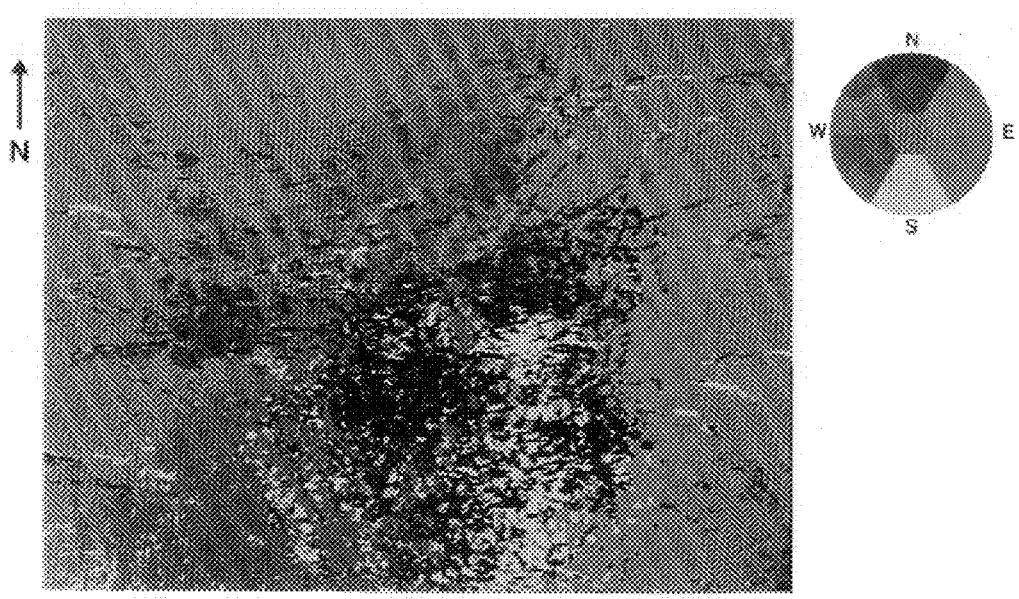

Since these 3D attributes were calculated for every point on the input seismic volume, they can be displayed as horizontal attribute time slices (See FIGS. 12A and 12B); these correspond to a time slice of the unprocessed seismic data. The interior of the salt dome, as well as the radial faults are displayed as dark colors, corresponding to incoherent zones of the data. Because of the nearly radial symmetry of the salt diapir at t=1,200 ms (See FIG. 12A), the dipping sediments that flank the diapir also radiate outward in an azimuthally simple fashion such that their azimuths correspond quite closely to the color legend on the left side of FIG. 9. This pattern is somewhat less symmetric at t=1,600 ms (See FIG. 12B), where there are shallower dips to the South than to the North. In addition, internal blocks of coherent data can be seen within the salt dome.

Figure 13A:
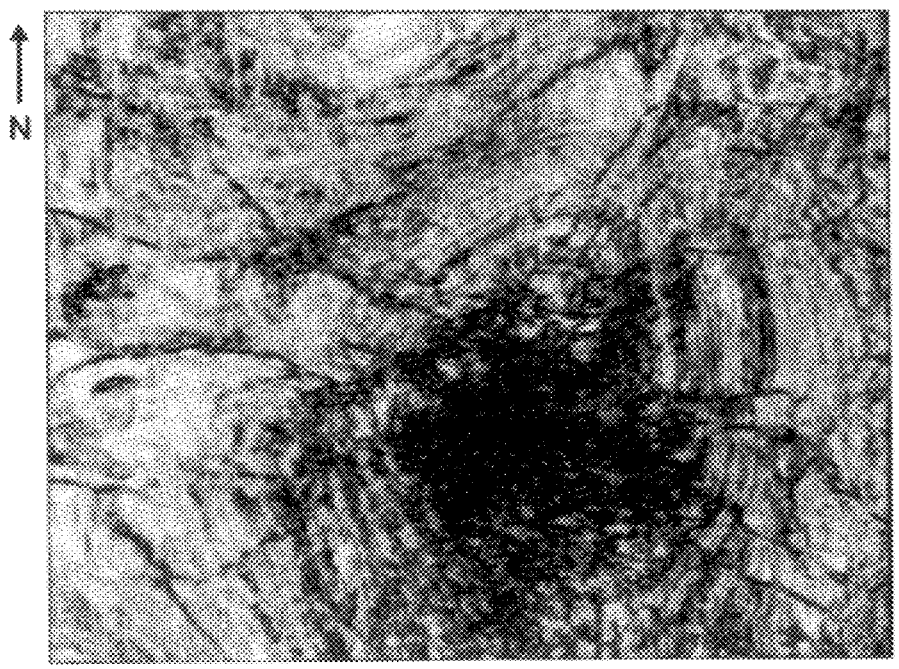
FIGS. 13A and 13B are gray scale displays of coherency.
Figure 13B:

The color legend displayed in FIG. 9 allows for only four "buckets" of coherency. In order to examine the coherency in greater detail, it can be plotted as a single attribute. This is shown in FIGS. 13A and 13B where all 184 colors are applied to the simple gray scale shown of FIG. 8C. In this display, maximum coherency (c=1.0) is rendered as white; minimum coherency (c=0.0) is rendered as black. While the interior of the salt diapir is shown as a highly incoherent zone, this display better shows subtle details in the radial faults patterns. In particular, faults emanating from the salt dome are shown, with some bifurcating as we move away. In addition to more continuous binning of the coherency attribute, part of this difference in perception is due to the fact that the human retina sees colors and black and white using different (cone vs. rod) receptors. There is also a physiological difference in the ability to differentiate between greens and blues between male and female populations. For this reason, male interpreters often prefer the simple single attribute coherency display shown in FIGS. 13A, 13B and FIG. 15A over the multiattribute ($\phi$,c,d) display shown in FIGS. 11A through 12B and FIG. 15B. In actuality, these displays are quite complimentary: the 3D component display being useful in recognizing the appearance of conflicting dips azimuths between adjacent rotated fault blocks; and the single component display being used to enhance the edge, or incoherent fault discontinuity, separating them.

Process Considerations

Figure 14A:
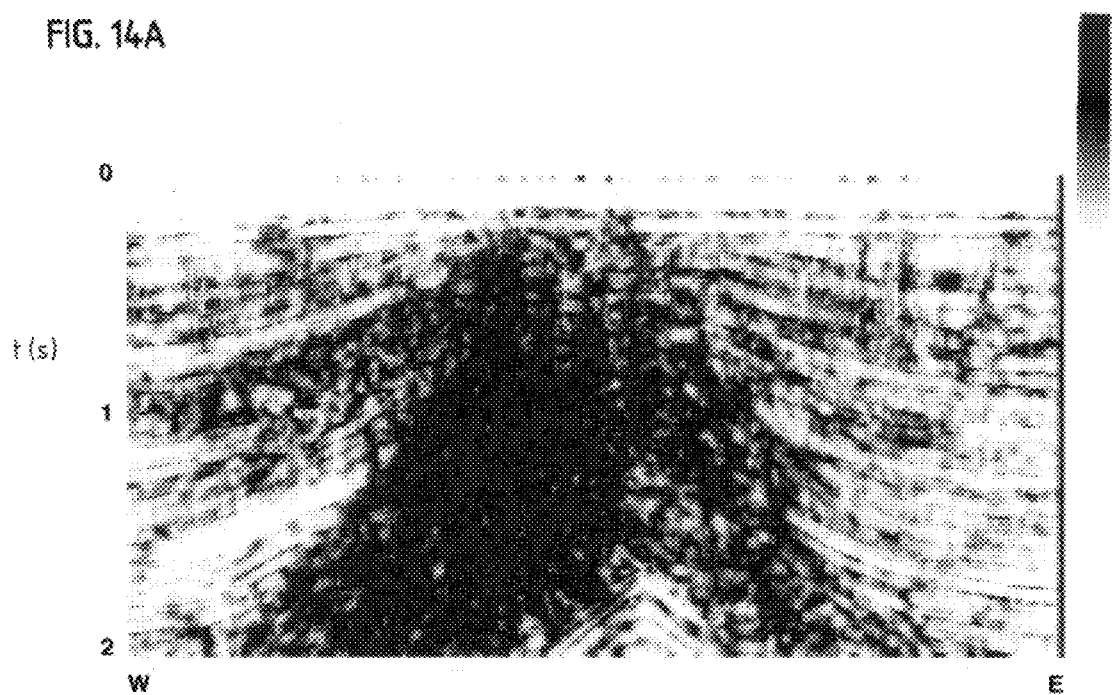
FIGS. 14A through 14C depict coherency slices corresponding to the data of FIGS. 10A through 10C.
Figure 14B:
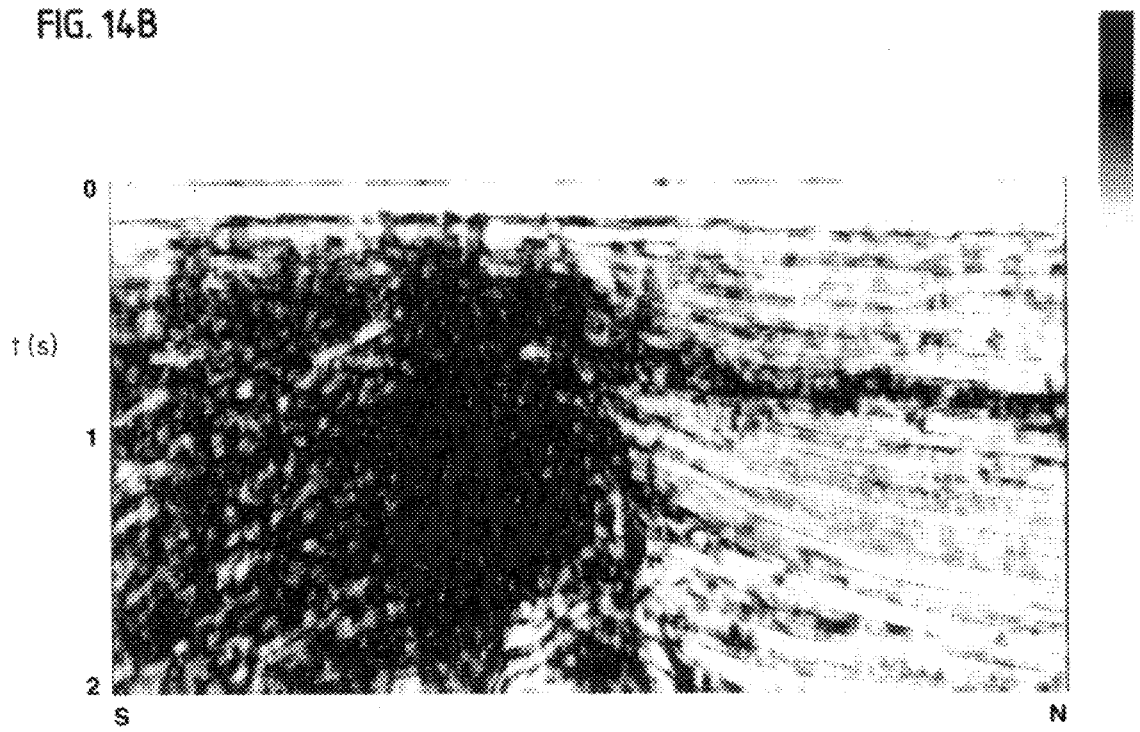
Figure 14C:
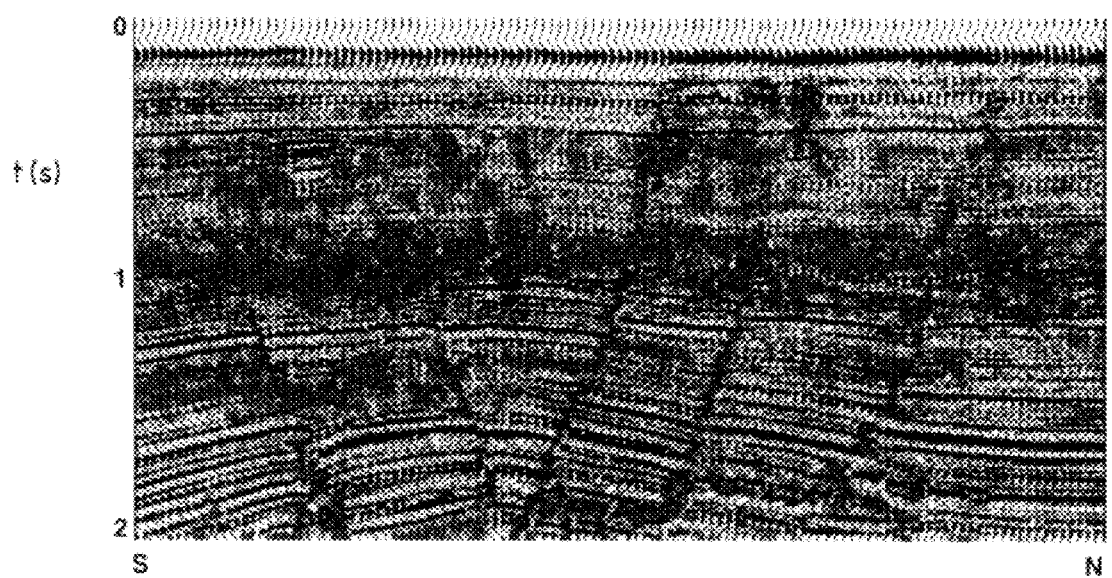

Careful study of FIGS. 13A and 13B reveals a ring-like pattern of incoherent energy circumscribing the salt dome. To investigate the cause of these artifacts, vertical slices were taken through the single component coherency cube corresponding to the seismic data in FIGS. 10A through 10C. This is shown in FIGS. 14A through 14C. The interior of the salt dome is clearly incoherent. An incoherent submarine canyon feature (described by Nissen et al., "3D Seismic Coherency Techniques Applied to the Identification and Delineation of Slump Features", 1995 SEG Expanded Abstracts, pages 1532–1534) is shown to the north of the salt dome. If the seismic data shown in FIGS. 10A through 10C were overlayed on the coherency sections shown in FIGS. 14A through 14C, one would see a close correspondence between areas of low coherency of FIGS. 14A through 14C with zero crossings of the seismic reflection events in FIGS. 10A through 10C. This is easily understood if it is assumed that there is a fixed, but incoherent, level of seismic noise throughout the data. For analysis points where the apparent dips are aligned with the peaks or troughs of strong amplitude seismic reflectors (such that the estimate of signal energy is high with respect to the incoherent noise), one can expect the signal-to-noise ratio to be high, giving rise to an estimate of high coherency. However, if, our analysis point is such that there are apparent dips aligned with the zero crossings of these same seismic reflectors, such that the signal is low with respect to our incoherent noise, one can expect the signal-to-noise ratio to be low, giving rise to a low estimate of coherency.

We have found three methods for increasing the signal-to-noise ratio: the first more appropriate for structural analysis; the second more appropriate for stratigraphic analysis, and the third appropriate for both.

For the case of steeply dipping (less than 45 degrees from the vertical) faults, the signal-to-noise ratio can be increased by simply increasing the size of our vertical analysis window w given in equation (2). Two effects will be observed. First, the structural leakage corresponding to the zero crossing points of the reflectors diminishes as vertical integration window size increases. Second, since few of the faults are truly vertical, the lateral resolution of the faults appears to decrease as the vertical window size increases. An analysis window of w=16 ms (which would encompass a full cycle of the peak 30 Hz energy in the data) appears to be in good compromise.

The second method (equally appropriate for stratigraphic and structural analysis) of increasing the signal-to-noise ratio, is to extract coherency along an interpreted stratigraphic horizon. If this stratigraphic horizon is associated with an extremum of the seismic data, such as a peak or trough, those data having only a relatively high signal-to-noise ratio are selectively displayed. Clearly, extracting coherency data corresponding to a zero crossing would greatly exacerbate the coherency display. A more economic version of this approach is to first flatten the data along the horizon of interest and then calculate the seismic attributes only along the picked horizon. This approach is somewhat more sensitive to busts in automatic (and human!) pickers, since cycle skip glitches in the picking are somewhat random and therefore will almost always appear as incoherent.

Shallow features (e.g., shallow channels; shallow tidal channel features corresponding to reworked deltaic sands; and small en echelon faulting) do not exist for any distance above or below an interpreted stratigraphic horizon; therefore, the inclusion of any data from above or below the horizon in which they are located adds uncorrelated amplitude variations, thereby making these discontinuities look more coherent, and hence washed out. If the time samples above or below the interpreted horizon contain independent, perhaps strong amplitude discontinuities, these discontinuities will bleed into the analysis for large windows, giving a stratigraphic horizon containing features mixed from stratigraphic different horizons generated at different geologic times.

The third method is a generalization of the original collection of seismic traces $u_j$ to that of an analytic trace $v_j$ defined as:

$$v_j(t) \equiv v_j(t) + iu_j^H(t)$$

where $u_j^H(t)$ is the quadrature, or Hilbert transform of $u_j(t)$, and i denotes $\sqrt{-1}$. The calculation of $\sigma(\tau,p,q)$ and $c(\tau,p,q)$ is entirely analogous to equations (1) and (2), where we note that the definition of $v_j^2$ is given by $$v_j^2 \equiv v_j v_j^* \equiv (u_j + iv_j)(u_j - iv_j).$$

The third method avoids numerical instabilities in the semblance estimate of equation (1) at the "zero-crossings" of an otherwise strong reflector.

The Effect of the Horizontal Analysis Window

By examining equation (2), it is clear that the computational cost of analysis increases linearly with the number of traces included in the analysis. However, by comparing a semblance based 11-trace coherency time slice with those of a 3-trace cross correlation coherency time slice, (where each has an identical vertical analysis window of w=32 ms) one is led to believe that adding more traces to the computation can increase the signal-to-noise ratio. In general, the signal to noise ratio increases as we increase the size of the analysis window. However, the overall coherency decreases somewhat (one sees less white), since the approximation of a possibly curving reflector by a constant (p,q) planar event breaks down as we increase the window size. In general, the signal-to-noise ratio of dip/azimuth estimates increases with the number of traces in the calculation, until a point is reached whereby the locally planar reflector approximation no longer holds.

Conclusions

The 3D semblance technique presented in this patent application provides an excellent measurement of seismic coherency. By using an arbitrary size analysis window, we are able to balance the conflicting requirements of maximizing lateral resolution and signal-to-noise ratio that is not possible when using a fixed three trace cross correlation technique. Accurate measurements of coherency can be achieved by using a short temporal (vertical) integration window that is on the order of the shortest period in the data, whereas a zero mean cross correlation technique preferably is used with an integration window that is greater than the longest period in the data. Thus, the semblance process results in less vertical smearing of geology than a cross correlation process, even for large spatial analysis windows (See FIGS. 15A and 15B). Equally important to the coherence estimate, the semblance process provides a direct means of estimating the 3D solid angle (dip and azimuth) of each reflector event. These solid angle maps may or may not be related to conventional time structure maps defining formation boundaries. Like the basic coherency process of Bahorich and Farmer (e.g., cross correlation), estimation of the instantaneous dip/azimuth cube can be achieved prior to any interpretation of the data for use in a gross overview of the geologic setting. In this reconnaissance mode, the coherency and instantaneous dip/azimuth cubes allow the user to pick key dip and strike lines crossing important structural or sedimentologic features very early in the interpretation phase of a project. In an interpretation mode, these dips and azimuths may be related to formation and/or sequence boundaries, such that one can map progradation and transgression patterns of the internal structure in 3D. Finally, having estimated the instantaneous dip and azimuth at every point in the data cube, one can apply conventional seismic trace attributes to locally planar reflectors, thereby greatly increasing signal-to-noise ratios.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Other algorithms may be used to measure the similarity of nearby regions of seismic data or to generate the "discontinuity cube." Moreover, equivalent computations may be substituted for those illustrated and described. For example, instead of a search over apparant dips p and q, one could search over dip and azimuth (d, $\phi$)). The inverse of the computed semblance may be used so as to obtain a display analogous to the negative of a photograph. Also certain features of the invention may be used independently of other features of the invention. For example, after the solid angle (dip and azimuth) has been estimated, a smoother and more robust multitrace estimate of the conventional complex trace attributes (Taner, M. T., Koehler, F., and Sheriff, R. E.; 1979; "Complex Seismic Trace Analysis;" *Geophysics*, 44, 1041–1063) may be obtained. Instead of calculating these attributes on a single trace, one can calculate attributes of the angle stack of traces within the analysis window. That is, one can calculate:

$$a_i(\tau,p,q)=\{[U(\tau,p,q)]^2+[U^H(\tau,p,q)]^2\}^{1/2},$$

$$\psi_i(\tau,p,q)=\tan^{-1}\{U^H(\tau,p,q)/U(\tau,p,q)\},$$

$$f_i = \frac{d\psi}{d\tau} = \frac{U(\tau,p,q)\frac{\partial U^H}{\partial \tau}(\tau,p,q)+U^H(\tau,p,q)\frac{\partial U}{\partial \tau}(\tau,p,q)}{[U(\tau,p,q)]^2+[U^H(\tau,p,q)]^2}$$

and $$b_i(\tau,p,q) = \frac{\left|U(\tau,p,q)\frac{\partial U}{\partial \tau}(\tau,p,q)+U^H(\tau,p,q)\frac{\partial U^H}{\partial \tau}(\tau,p,q)\right|}{[U(\tau,p,q)]^2+[U^H(\tau,p,q)]^2}$$

where
$U(\tau,p,q)$ is $$\left\{\sum_{j=1}^{J} u[\tau-(px_j+qy_j), x_j, y_j]\right\}^2$$

(See the numerator of equation 1);

$U^H(\tau,p,q)$ is the Hilbert transform, or quadrature component of $U(\tau, p, q)$;

$a_i(\tau,p,q)$ is the envelope, or instantaneous amplitude;

$\psi_i(\tau,p,q)$ is the instantaneous phase;

$f_i(\tau,p,q)$ is the instantaneous frequency; and $b_i(\tau,p,q)$ is the instantaneous bandwidth (See Cohen, L.; 1993; "Instantaneous Anything;" *Proc. IEEE Int. Conf. Acoust. Speech Signal Processing*, 4, 105–109).

In addition to these "instantaneous" attributes, other attributes are suggested to characterize the signal within a given lobe of the trace envelope to be that of the attribute at the peak of the envelope $\tau_\Theta$. These include (See Bodine, J. H.; 1994; "Waveform Analysis with Seismic Attributes;" presented at the 54th Ann. Intl. Mtg. SEG, Atlanta, Ga., USA):

the wavelet envelope:

$$a_r(\tau,p,q)=a_i(\tau_\Theta,p,q),$$

the wavelet phase:

$$\psi_r(\tau,p,q)=\psi_i(\tau_\Theta,p,q),$$

the wavelet frequency:

$$f_r(\tau,p,q)=f_i(\tau_\Theta,p,q),$$

the wavelet bandwidth:

$$b_r(\tau,p,q)=b_i(\tau_\Theta,p,q),$$

the zero phase component:

$$U^0(\tau,p,q)=\cos[\psi_r(\tau,p,q)]U(\tau,p,q)+\sin[\psi_r(\tau,p,q)]U^H(\tau,p,q)$$

the ninety degree phase component:

$$U^{90}(\tau,p,q)=-\sin[\psi_r(\tau,p,q)]U(\tau,p,q)+\cos[\psi_r(\tau,p,q)]U^H(\tau,p,q)$$

as well as skewness, rise time, and response length. Since mixing occurs along the true dip direction, slowly varying amplitude, phase, frequency, and bandwidth components of the event will be preserved. Moreover, the computation of coherency/semblance/similarity allows one to perform "texture analysis" of similar seismic regions. Texture analysis combined with "cluster analysis" leads to segmentation analysis. Among other things, this allows one to make geologic correlations and extrapolate the geological character of the subsurface. In addition, determination of the coherency may be used to impose a priori constraints for both post-stack and pre-stack seismic inversion. Thus, it will be appreciated that various modifications, alternatives, variations, and changes may be made without departing from the spirit and scope of the invention as defined in the appended claims. It is, of course, intended to cover by the appended claims all such modifications involved within the scope of the claims.

APPENDIX 1

MULTIATTRIBUTE HLS CALIBRATION

The hues are pure, or 100% saturated colors, and correspond to the following 1994 non-toxic 96 crayon "Crayola" standard:

| direction | φ (hue) | Crayola Color |
|---|---|---|
| N | 0 | blue |
| NNE | 30 | plum |
| ENE | 60 | magenta |
| E | 90 | salmon |
| ESE | 120 | red |
| SSE | 150 | orange-red |
| S | 180 | yellow |
| SSW | 210 | lime-green |
| WSW | 240 | green |
| W | 270 | forest-green |
| WNW | 300 | cyan |
| NNW | 330 | cerulean |
| N | 360 | blue |

Partial 50% saturation corresponds to "dirtier" or "muddier" colors:

| direction | φ (hue) | Crayola Color |
|---|---|---|
| N | 0 | cadet blue |
| NE | 45 | fuscia |
| E | 90 | maroon |
| SE | 135 | sepia |
| S | 180 | gold |
| SW | 225 | olive |
| W | 270 | sea green |
| NW | 315 | steel blue |
| N | 360 | cadet blue |

0% saturation corresponds to no color pigment:

| direction | φ (hue) | Crayola Color |
|---|---|---|
| N | 0 | gray |
| E | 90 | gray |
| S | 180 | gray |
| W | 270 | gray |
| N | 360 | gray |

Low values of lightness correspond to "dark" colors; intermediate values of lightness correspond to "deep" colors, and high values of lightness correspond to "pastel" colors.

APPENDIX 2

SYNOPSIS

\semb3d [-Nfile_in] [-Ofile_out] [-hisfile_hls] [-tstarttstart] [-tendtend]
[-ildmdx] [-cldmdy] [-aplengthaplength] [-apwidthapwidth] [-apheightapheight]
[-apazimapazim] [-llazlmxazim] [-clazimyazim] [-dzdz] [-smaxsmax] [-pminpmin]
[-pmaxpmax] [-qminqmin] [-qmaxqmax] [-threshthresh] [-freffref]
[-startlinestartline] [-endlineendline] [-exppower] [-min] [-int] [-R]
DESCRIPTION semb3d reads in 3D seismic post stack time or depth data and generates semblance, dip and azimuth outputs.

COMMAND LINE ARGUMENTS semb3d gets all its parameters from command line arguments. These arguments specify the input, output, spatial analysis window, and dip discretization parameters. The following command line arguments have been used in one embodiment of the invention.
-Nfile_in Enter the input data set name or file immediately after typing -N. This input file should include the complete path name if the file resides in a different directory. Example: -N/export/data2/san_juan/time_stack tells the program to look for file 'time_stack' in directory '/export/data2/san_juan'. For this program, the data is stored as a rectangular grid of regularly binned data. The number of traces (denoted by lineheader word 'NumTrc') defines the number of traces in the 'x' direction. The number of records (seismic lines denoted by lineheader word 'NumRec') defines the number of traces in the 'y' direction. Missing data padded in with dead traces flagged by a dead trace header flag.
-Ofile_out Enter the output multi-attribute data set name or file immediately after typing -O. Attributes will be output back to back, line by line. Without scaling the semblance c̄ will range between 0.0 and 1.0. The values of dip will range between 0 and smax and will always be positive (pointing down). Units are in msec/m (msec/ft) for time data, or m/m (ft/ft) for depth data. The azimuth φ is perpendicular to strike and points in the direction of maximum

APPENDIX 2-continued positive dip (pointing down). The values of azimuth will range between 0 and 360 degrees.
Properly defined, an output azimuth of 0. degrees corresponds to North, while an output
azimuth of 90 degrees corresponds to East. The values of OMEGA = (d, $\phi$) can be chosen
such that (when converted to an 8 bit integer) the left most 6 bits correspond to a valid
Seisworks color table. This color table corresponds to the HLS color model previously
described and is generated using a program that maps the angles scanned into an HLS
(hue, lightness, saturation) color map of OMEGA = (d, $\phi$).
-hls file_hls Enter -hls followed by the hls table file name to output an ascii flat file containing the hue,
lightness and saturation of each sample contained in the output. This file is input to a
program to generate a RGB (red, green, blue) color lookup table needed for a proper
display on certain workstations.
-tstarttstart Enter -tstart followed by the beginning of the analysis window in msec.
-tendtend Enter -tend followed by the end of the analysis window in msec. The output record will be
(tend – tstart) msec long.
-ildmdx After -ildm enter the in-line distance measure (trace separation) in m (ft).
-cldmdy After -cldm enter the cross-line distance measure (line separation) in m (ft).
-dzdz After -dz enter the vertical depth sample increment in m (ft). A value of dz > 0 indicates the
data are in depth.
-aplengthaplength After -aplength enter the half aperture length (in meters or feet) along the azimuth of the
elliptical analysis window to be used. Increasing the analysis window by increasing
aplength, apwidth will result in: (1) increased angular resolution, (2) decreased spatial
resolution, (3) increased computational cost; and (4) decreased overall coherency (since the
plane wave approximation is less valid).
-apwidthapwidth After -apwidth enter the half half aperture width (in meters or feet) perpendicular to the
azimuth of the elliptical analysis window to be used.
-apheightapheight After -apheight enter the half length in milliseconds (or meters or feet) of the running time
(depth) integration window applied over the semblance. Example = ±2 samples. Increasing
the temporal integration window apheight will result in: (1) a smoothed, less noisy response,
(2) decreased vertical resolution, and (3) no change in computational cost.
-apazimapazim After -apazim enter the azimuth of the elliptical analysis window (with 0 being North and 90
being East).
-smaxsmax After -smax enter the maximum dip to be tested in msec/m (msec/ft) for time data, or in
m/m (ft/ft) for depth data. This is recommended when there is no preferential strike
direction in the data. This value can be read directly from a section display of the data.
smax will be on the order of .30 msec/m (10 msec/ft) for time data. Increasing the value of
smax beyond any true dips results in significantly increased computational cost for an
identical result.
-pminpmin After -pmin enter the minimum inline (increasing trace number) dip to be tested in msec/m
(msec/ft) for time data, or in m/m (ft/ft) for depth data. This is recommended when there is
a predominant strike direction parallel or perpendicular to the data acquisition lines. This
value can be read directly from a section display of the data.
-pmaxpmax After -pmax enter the maximum in-line (increasing trace number) dip to be tested in
msec/m (msec/ft) for time data, or in m/m (ft/ft) for depth data. This is recommended when
there is a predominant strike direction parallel or perpendicular to the data acquisition lines.
This value can be read directly from a section display of the data.
-R Enter this command line argument to define a rectangular (2*aplength by 2*apwidth) vs.
elliptical analysis window oriented along the azimuth axis.
-qminqmin After -qmin enter the minimum cross-line (increasing line number) dip to be tested in
msec/m (msec/ft) for time data, or in m/m (ft/ft) for depth data. This is recommended when

APPENDIX 2-continued there is a predominant strike direction parallel or perpendicular to the data acquisition lines.
This value can be read directly from a section display of the data.
-qmaxqmax After -qmax enter the maximum cross-line (increasing line number) dip to be tested in
msec/m (msec/ft) for time data, or in m/m (ft/ft) for depth data. This is recommended when
there is a predominant strike direction parallel or perpendicular to the data acquisition lines.
This value can be read directly from a section display of the data
-threshthresh After -thresh enter the threshhold or cutoff semblance value, below which dip and
azimuth are considered to be valid measures; below this value shades of gray will be
displayed. Some display software limits the number of colors available for display.
-freffref After -fref enter the reference frequency in cycles/sec (Hz) for time data, or in cycles/km
(cycles/kft) used in determining the number of dips to be searched (e.g., fref = 60 Hz for
time data, 30 cycles/km for depth data).
-ilazimilazim After -ilazim enter the in-line azimuth (0 degrees being North, 90 degrees being East) that
is the azimuth of increasing trace number. This value is used to calibrate a solid angle
output file, if used.
-clazimclazim After -clazim enter the cross-line azimuth (0 degrees being North, 90 degrees being East)
that is the azimuth of increasing line numbers. This value is used to calibrate the solid
angle output file, if used.
-exppower After -exp enter the exponent to be applied for non-linear scaling of the semblance. In
general, most semblance/coherency values will be between 0.8 and 1.0. Scaling with
power = 2.0 would map these values between .64 and 1.0, scaling with power = 4.0 would
map these values between .41 and 1.0, and so forth. This is useful for loading data to an
interpretive workstation.
-startlinestartline After -startline enter the first output line to be generated.
-endlineendline After -endline enter the last output line to be generated.
-min After -min enter this command line argument to extract the dip, azimuth, and semblance
corresponding to the minimum semblance of the angles searched. (As a default, the
program searches for the maximum semblance or coherency).
-int Enter this command line argument to scale output such that it can be represented by an 8
bit integer ranging between −128 and +127. Useful for loading data to an interpretive
workstation.

We claim:

1. A method for the exploration of hydrocarbons, comprising the steps of:

(a) obtaining a representation of a set of seismic traces distributed over a pre-determined three-dimensional volume of the earth, said volume of the earth having subterranean features characterized by dip and dip azimuth that are defined relative to a pre-defined dip azimuth measurement axis;

(b) dividing said three-dimensional volume into at least one horizontal time layer, and dividing said time layer into a plurality of three-dimensional analysis cells, wherein each analysis cell has two pre-determined, mutually perpendicular lateral dimensions and has portions of at least five laterally separated seismic traces located therein;

(c) calculating, within each of said analysis cells, a plurality of measures of the semblance of said traces located therein, wherein each measure of semblance is at least a function of time, the number of seismic traces within said analysis cell, and the apparent dip and apparent dip azimuth of said traces within said analysis cell;

(d) identifying, within each analysis cell, the largest of said calculated measures of semblance and defining the corresponding apparent dip and apparent dip azimuth to be an estimate of the true dip and an estimate of the true dip azimuth of the seismic traces within said analysis cell; and (e) forming, from all of said analysis cells, a seismic attribute display from said largest calculated measures of semblance and said corresponding estimates of the true dip and the true dip azimuth of the seismic traces within said time layer.

2. The method of claim 1, where step (e) is performed by forming a color map that is characterized by hue, saturation and lightness, wherein one of said estimates of true dip azimuth, said estimates of true dip, and said largest calculated measures of semblance is mapped onto one of a lightness scale, hue scale, and a saturation scale;

wherein another of said estimates of true dip azimuth, said estimates of true dip, and said largest calculated measures of semblance is mapped onto another of said lightness scale, said hue scale, and said saturation scale; and wherein the remaining one of said estimates of true dip azimuth, said estimates of true dip, and said largest calculated measures of semblance is mapped onto the remaining one of said lightness scale, said hue scale, and said saturation scale.

3. The method of claim 2, where step (e) is performed by mapping said estimates of true dip azimuth onto said hue scale.

4. The method of claim 2, where step (e) is performed by mapping said estimates of true dip onto said saturation scale.

5. The method of claim 2, where step (e) is performed by mapping said largest calculated measures of semblance onto a lightness scale.

6. The method of claim 1, where in performing step (c) each measure of semblance is at least a function of the energy of said traces; and wherein said energy of said traces is a function of time, the number of seismic traces within said analysis cell, and the apparent dip and apparent dip azimuth of said traces within said analysis cell.

7. The method of claim 6, wherein each measure of semblance is at least a function of:

$$\left(\sum_{j=1}^{J} u_f(t, p, q, x_j, y_j)\right)^2 \text{ and } \sum_{j=1}^{J} u_f(t, p, q, x_j, y_j)^2$$

where each analysis cell contains portions of at least J (J≧5) seismic traces, where x and y are distances measured from the center of the analysis cell, where p and q are the apparent dips in the x and y directions respectively, and where $u_f(t,p,q,x,y)$ is a seismic trace within the analysis cell; and wherein the true dip d and dip azimuth φ are related to p and q by p=d sinφ p and q=d cosφ.

8. The method of claim 7, wherein each measure of semblance is a function of:

$$\frac{\left(\sum_{j=1}^{J} u_f(t, p, q, x_j, y_j)\right)^2}{\sum_{j=1}^{J} u_f(t, p, q, x_j, y_j)^2}.$$

9. The method of claim 7, wherein each measure of semblance for each dip, dip azimuth, and analysis point are smoothed by performing a running window time integration over the partial sums from –K to +K:

$$\frac{\sum_{k=-K}^{+K} \left(\sum_{j=1}^{J} [u_f(t + k\Delta t, p, q, x_j, y_j)]\right)^2}{\sum_{k=-K}^{+K} \sum_{j=1}^{J} [u_f(t + k\Delta t, p, q, x_j, y_j)]^2}$$

where K is the half width of the time window in samples.

10. The method of claim 1, wherein said traces within said analysis cells are characterized by a maximum dip and a maximum temporal frequency component; and wherein step (c) includes the steps of:
obtaining an estimate of the maximum true dip and the maximum temporal frequency component of said traces in said analysis cell;
using said maximum true dip, said maximum temporal frequency and said pre-determined lateral dimensions of said analysis cell to calculate apparent dip increments in two generally perpendicular directions relative to said dip azimuth measurement axis.

11. The method of claim 1, where in performing step (c) said measure is at least a function of:

$$\left\{\sum_{j=1}^{J} u[\tau - (px_j + qy_j)]\right\}^2$$

where J is the number of traces in said analysis cell, where $u_j(\tau,p,q)$ is a representation of the seismic trace in said analysis cell, where τ is the time, p is the apparent dip in the x direction, and q is the apparent dip in the y direction; wherein p and q are measured in ms/m and the x and y directions are mutually perpendicular.

12. The method of claim 11, where in performing step (c) said measure is also a function of:

$$\sum_{j=1}^{J} \{u(\tau - (px_j + qy_j)]\}^2.$$

13. The method of claim 12, where in performing step (c) said measure is a function of:

$$\frac{\left\{\sum_{j=1}^{J} u[\tau - (px_j + qy_j)]\right\}^2}{\sum_{j=1}^{J} \{u[\tau - (px_j + qy_j)]\}^2}.$$

14. A method of locating subterranean features, faults, and contours, comprising the steps of:
(a) accessing 3D seismic data covering a pre-determined volume of the earth;
(b) dividing said volume into an array of relatively small three-dimensional cells wherein each of said cells is characterized by at least five laterally separated and generally vertical seismic traces located therein;
(c) determining in each of said cells the semblance/similarity of said traces relative to two pre-determined directions; and
(d) recording said semblance/similarity of said cells in a form for display as a two-dimensional map of subterranean features.

15. The method of claim 14, where in performing step (c) said pre-determined directions are mutually perpendicular; and said semblance/similarity of said traces within each cell is a function of at least time, the number of seismic traces within said analysis cell, and the apparent dip and apparent dip azimuth of said traces within said analysis cell.

16. The method of claim 15, where said semblance/similarity of said traces within each cell is determined by computing a plurality of measurements of the semblance/similarity of said traces within each cell and selecting the largest of said measurements of said semblance/similarity of each cell; and wherein step (c) further includes the step of defining the apparent dip and apparent dip azimuth corresponding to said largest of said measurements to be an estimate of the true dip and an estimate of the true dip azimuth of the seismic traces within said analysis cell.

17. The method of claim 16, wherein each of said plurality of measurements of said semblance/similarity is at least a function of the energy of said traces; and wherein said energy of said traces is a function of time, the number of seismic traces within said analysis cell, and the apparent dip and apparent dip azimuth of said traces within said analysis cell.

18. The method of claim 16, wherein said map is a color map that is characterized by hue, saturation and lightness;
   wherein one of said estimates of true dip azimuth, said estimates of true dip, and said largest calculated measures of semblance is mapped onto one of a lightness scale, hue scale, and a saturation scale;
   wherein another of said estimates of true dip azimuth, said estimates of true dip, and said largest calculated measures of semblance is mapped onto another of said lightness scale, said hue scale, and said saturation scale; and
   wherein the remaining one of said estimates of true dip azimuth, said estimates of true dip, and said largest calculated measures of semblance is mapped onto the remaining one of said lightness scale, said hue scale, and said saturation scale.

19. The method of claim 18, wherein step (d) comprises the steps of: mapping said estimates of true dip azimuth onto said hue scale, mapping said estimates of true dip onto said saturation scale, and mapping said largest calculated measures of semblance onto a lightness scale.

20. In seismic exploration wherein 3D seismic data comprising reflected seismic energy is recorded as a function of time and wherein a computer is used that is programmed to process such seismic traces and to produce an image therefrom that is representative of subterranean features, an article of manufacture comprising:
   a medium that is readable by a computer and that carries instructions for said computer to perform a process comprising the steps of:
   (a) accessing 3D seismic data over a predetermined volume of the earth, said data comprising seismic traces that are characterized by time, position and amplitude; and
   (b) ascertaining the similarity of nearby regions of said 3D seismic data of said volume by:
      (1) dividing at least a portion of said data into an array of relatively small, adjacent, three-dimensional analysis cells, wherein each of said analysis cells contains portions of at least five seismic traces; and
      (2) computing a seismic attribute for each cell that is a function of the largest of a plurality of measurements of semblance and the corresponding apparent dip and the corresponding apparent dip azimuth.

21. The article of manufacture of claim 20, wherein said medium carries instructions for the computer to perform step (2) by making measurements of semblance that are a function of:

$$\sum_{j=1}^{J} u[\tau - (px_j + qy_j)].$$

where x and y are distances measured from the center of the analysis cell along mutually perpendicular x and y axes, where J traces is the number of seismic traces, where $u_j(\tau,p,q)$ represents a seismic trace, where $\tau$ is the time, p is the apparent dip in the x direction, and q is the apparent dip in the y direction; and wherein p and q are measured in ms/meter.

22. The article of manufacture of claim 21, wherein said medium carries instructions for the computer to perform step (2) by making measurements of the semblance that are also a function of:

$$\left\{\sum_{j=1}^{J} u[\tau - (px_j + qy_j)]\right\}^2.$$

23. The article of manufacture of claim 21, wherein said medium carries instructions for said computer to perform step (1) by forming analysis cells having an elliptical cross-section.

24. The article of manufacture of claim 23, wherein said predetermined volume is characterized by a fracture having an ascertainable direction; and wherein said medium carries instructions for said computer to form analysis cells that are generally elliptical in shape and that have major axes aligned in the direction of said fracture.

25. In seismic exploration wherein reflected seismic energy is recorded as a function of time to produce a series of seismic traces, a method comprising the steps of:
   (a) accessing a data set of seismic traces distributed over a three-dimensional volume of the earth, said volume of the earth having subterranean features characterized by dip and dip azimuth;
   (b) calculating a plurality of measures of the semblance of said traces within a relatively small three dimensional analysis cell that is located within said volume and at one part of a predetermined time layer, wherein each measure of semblance is at least a function of time, the number of seismic traces within said analysis cell, and the apparent dip and apparent dip azimuth of said traces within said analysis cell;
   (c) computing a seismic attribute for said analysis cell that is at least a function of the largest of said plurality of calculated measures of semblance and the corresponding apparent dip and the corresponding apparent dip azimuth, wherein said corresponding apparent dip and said corresponding apparent dip azimuth are defined to be estimates of the true dip and an estimate of the true dip azimuth of the seismic traces within said analysis cell;
   (d) repeating steps (b) and (c) along other parts of said time layer; and
   (e) forming a map of said seismic attributes over said time layer.

26. The method of claim 25, wherein step (a) comprises the steps of:
   (1) accessing 3D seismic data over a predetermined volume of the earth, said 3D seismic data comprising at least eleven seismic traces that are characterized by time, position and amplitude; and
   (2) dividing a portion of said volume into at least one time layer comprising an array of relatively small, three-dimensional cubes that contain at least five seismic traces; and wherein said cubes are used as the cells to perform step (b).

27. The method of claim 26, where in performing step (b) each measure of semblance is a function of:

$$\frac{\left\{\sum_{j=1}^{J} u_f(t, p, q, x_j, y_j)\right\}^2}{\sum_{j=1}^{J} u_f(t, p, q, x_j, y_j)^2}$$

where each analysis cell contains portions of at least J seismic traces, where J is at least 5, where x and y are distances measured from the center of the analysis cell along mutually perpendicular x and y axes, where p and q are the apparent dips in the x and y directions, where $u_f(t,p,q,x,y)$ represents a seismic trace within said analysis cell, and where the true dip d and dip azimuth $\phi$ are related to p and q by $p=d \sin(\phi)$ and $q=d \cos(\phi)$.

28. The method of claim 27, wherein each measure of semblance for each dip, dip azimuth, and analysis point are smoothed by forming a running window time integration over partial sums of a time window within said horizontal time layer.

29. A method of seismic exploration, comprising the steps of:
(a) reading a 3D seismic data set comprising seismic signal traces that are distributed over a volume of the earth;
(b) selecting at least one horizon slice from said volume and forming therein cells that are arranged into laterally extending rows and columns, each of said cells having at least five seismic traces extending generally therethrough;
(c) computing for each of said cells:
(1) a plurality of semblance measurements of said traces, wherein each measurement is at least a function of time, the number of seismic traces within said analysis cell, and the apparent dip and apparent dip azimuth of said traces;
(2) the largest of said plurality of measurements of semblance; and
(3) an estimate of the true dip and an estimate of the true dip azimuth of the seismic traces within said analysis cell from the apparent dip and apparent dip azimuth corresponding to said largest measurement of semblance; and
(d) displaying, over said at least one horizon slice, of representations of said largest measurements of semblance and said estimated true dips and said estimated true dip azimuths of each of said cells.

30. The method of claim 29, wherein step (b) is performed by selecting a horizon slice that is characterized by a common time; and wherein step (d) is performed by displaying across said time slice representations of said largest measurements of semblance and said estimated true dips and said estimated true dip azimuths of said cells.

31. The method of claim 29, wherein step (d) is performed by forming a color map that is characterized by hue, saturation and lightness, wherein for each of said cells:
one of said estimates of true dip azimuth, said estimates of true dip, and said largest calculated measurements of semblance is mapped onto one of a lightness scale, hue scale, and a saturation scale;
wherein another of said estimates of true dip azimuth, said estimates of true dip, and said largest calculated measurements of semblance is mapped onto another of said lightness scale, said hue scale, and said saturation scale; and
wherein the remaining one of said estimates of true dip azimuth, said estimates of true dip, and said largest calculated measurements of semblance is mapped onto the remaining one of said lightness scale, said hue scale, and said saturation scale.

32. In the exploration for gas and oil wherein over a volume of the earth seismic traces are recorded, a method comprising the steps of:
(a) grouping at least parts of at least five relatively close seismic traces into a plurality of relatively small three-dimensional analysis cells;
(b) performing in each of said cells a plurality of measurements of the semblance of said parts of said traces as a function of at least time, the number traces therein, the apparent dip of said traces, and the apparent dip azimuth;
(c) identifying in each of said cells the largest of said plurality of measurements of semblance, the corresponding apparent dip, and the corresponding dip azimuth; and
(d) converting said largest measurements of semblance, said corresponding dip and said corresponding dip azimuth of said cells into color attributes of hue, saturation and lightness, wherein for each cell:
one of said dip azimuth, said dip, and said largest measurements of semblance is mapped onto one of a lightness scale, hue scale, and a saturation scale;
another of said dip azimuth, said dip, and said largest measurements of semblance is mapped onto another of said lightness scale, said hue scale, and said saturation scale; and
the remaining one of said dip azimuth, said dip, and said largest measurements of semblance is mapped onto the remaining one of said lightness scale, said hue scale, and said saturation scale.

33. A device adapted for use by a workstation wherein 3D seismic data is read into memory and processed into a color display of subterranean features, comprising:
computer readable means carrying instructions for a process comprising the steps of:
(1) digitally locating said 3D seismic data in an array of relatively small three-dimensional cells, wherein each of said cells contains representations of a part of at least five seismic traces;
(2) calculating for each of said cells an estimate of the semblance, an estimate of the true dip, and an estimate of the true dip azimuth of said parts; and
(3) converting said estimates of semblance, said estimates of true dip, and said estimates of true dip azimuth into an array of digital values corresponding to the color attributes of hue, saturation, and lightness.

34. The device of claim 33, wherein one of said estimates of true dip azimuth, said estimates of true dip, and said estimates of semblance is mapped onto one of a lightness scale, a hue scale, and a saturation scale for each of said cells;
wherein another of said estimates of true dip azimuth, said estimates of true dip, and said estimates of semblance is mapped onto another of said lightness scale, said hue scale, and said saturation scale for each of said cells; and
wherein the remaining one of said estimates of true dip azimuth, said estimates of true dip, and said estimates of semblance is mapped onto the remaining one of said lightness scale, said hue scale, and said saturation scale for each of said cells.

35. The device of claim 33, wherein said computer readable means carries instructions to perform step (2) by:
(i) calculating a plurality of semblance measurements relative to at least two directions, and selecting the largest of said measurements;
(ii) selecting the apparent dip corresponding to said largest measurement of semblance from step (i); and
(iii) selecting the apparent dip azimuth corresponding to said largest measurement of semblance from step (i).

36. The device of claim 33, wherein said computer-readable means is selected from the group consisting of a magnetic tape, a magnetic disk, an optical disk and a CD-ROM.

37. A method of prospecting for hydrocarbon deposits, comprising the steps of:
  (a) obtaining a color seismic attribute display of 3D seismic data for a predetermined three-dimensional volume of the earth, said display being generated by using data obtained by a computer and at least one program for said computer that instructs said computer to perform the following steps:
    (1) convert said volume into an array of relatively small three-dimensional cells, wherein each of said cells has a portion of at least five seismic traces located therein;
    (2) make a plurality of semblance measurements within each of said cells, wherein each measurement is at least a function of time, the number of seismic traces within said cell, the apparent dip of said traces and apparent dip azimuth of said traces;
    (3) select the largest of said plurality of measurements of semblance in each cell;
    (4) use as an estimate of the true dip and an estimate of the true dip azimuth in each cell the apparent dip and apparent dip azimuth that correspond to said largest measurement of semblance in said cell;
    (5) map said estimates of true dip azimuth onto a hue scale;
    (6) map said estimates of true dip onto a saturation scale; and
    (7) map said largest calculated measures of semblance onto a lightness scale; and
  (b) using said color display to identify subsurface structural and sedimentological features commonly associated with the entrapment and storage of hydrocarbons.

38. The method of claim 37, further including the step of using said map to identify drilling hazards.

39. The method of claim 38, further including the step of drilling at a location identified in step (b).

40. The method of claim 37, wherein step (a)(2) comprises the step of computing:

$$\sum_{j=1}^{J} u[\tau - (px_j + qy_j)]$$

where each cell is characterized by two perpendicular dimensions, where x and y are distances measured from the center of the cell along mutually perpendicular x and y axes, where J is the number of seismic traces, where $u_j(\tau,p,q)$ represents a seismic trace, where $\tau$ is the time, p is the apparent dip in the x direction, and where q is the apparent dip in the y direction.

41. The method of claim 40, wherein step (a)(2) comprises the step of computing:

$$\left\{\sum_{j=1}^{J} u[\tau - (px_j + qy_j)]\right\}^2.$$

42. In a computer workstation wherein 3-D seismic data obtained over a predetermined three-dimensional volume of the earth is read into memory, wherein a computer divides such volume into an array of three-dimensional analysis cells, wherein each cell has at least a portion of five laterally separated seismic traces located therein, and wherein the computer is used to transform such data into a display of seismic attributes, the computer CHARACTERIZED BY performing a process comprising the steps of:
  (1) calculating in each of the cells a semblance value for said seismic traces, wherein said semblance value is at least a function of time, the number of seismic traces within said cell, the apparent dip of said traces, and the apparent dip azimuth of said traces; and
  (2) displaying said semblance value of each cell that lies between two planes within the 3-D volume to identify subsurface features commonly associated with the entrapment and storage of hydrocarbons.

43. The computer workstation of claim 42, wherein the computer performs step (1) by: making a plurality of semblance measurements within each of said cells; and selecting the largest of said plurality of measurements as said semblance value of said cell.

44. The computer workstation of claim 43, wherein after performing step (1) the computer performs the step of: using the apparent dip and the apparent dip azimuth that correspond to said largest measurement of semblance in said cell as an estimate of true dip and as an estimate of true dip azimuth of said cell.

45. The computer workstation of claim 44, wherein the display of step (2) is characterized by color components of hue, saturation and lightness; and wherein step (2) comprises the steps of mapping said estimate of true dip azimuth for each cell onto a hue scale; mapping said estimate of true dip for each cell onto a saturation scale; and mapping said largest calculated measures of semblance onto a lightness scale.

* * * * *

UNITED STATES PATENT AND TRADEMARK OFFICE
CERTIFICATE OF CORRECTION

PATENT NO. : 5,930,730
DATED : Jul. 27, 1999
INVENTOR(S) : Kurt J. Marfurt, R. Lynn Kirlin, Steven L. Farmer, Michael S. Bahorich It is certified that error appears in the above-identified patent and that said Letters Patent is hereby corrected as shown below:

| Col. | Line |  |
|---|---|---|
| 9 | 37 | "=u[τ-d)(x sin φ " . . .<br><br>should read:<br>"=u[τ-d (x sin φ " . . . |
| 9 | 51 | "J_f(ξ,p,q," . . .<br><br>should read:<br>"u_f(ξ,p,q," . . . |
| 13 | 59 | "azimuth (d,φ))."<br><br>should read:<br>"azimuth (d,φ)." |
| 22 | 17,18 | "$\sum_{j=1}^{J}\{u(\tau-(\rho x_j$ " . . .<br><br>should read:<br>"$\sum_{j=1}^{J}\{u[\tau-(\rho x_j$ " . . . |

Signed and Sealed this

Eleventh Day of April, 2000

Attest:

Q. TODD DICKINSON

*Attesting Officer*  *Director of Patents and Trademarks*